US010962009B2

(12) United States Patent
Pham et al.

(10) Patent No.: US 10,962,009 B2
(45) Date of Patent: *Mar. 30, 2021

(54) VARIABLE SPEED COMPRESSOR PROTECTION SYSTEM AND METHOD

(71) Applicant: Emerson Climate Technologies, Inc., Sidney, OH (US)

(72) Inventors: Hung M. Pham, Dayton, OH (US); Stephen M. Seibel, Celina, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/131,585

(22) Filed: Sep. 14, 2018

(65) Prior Publication Data

US 2019/0017508 A1    Jan. 17, 2019

Related U.S. Application Data

(63) Continuation of application No. 15/346,220, filed on Nov. 8, 2016, now Pat. No. 10,077,774, which is a (Continued)

(51) Int. Cl.
*F25B 49/00* (2006.01)
*F04C 28/28* (2006.01)
(Continued)

(52) U.S. Cl.
CPC ............ *F04C 28/28* (2013.01); *F04B 39/06* (2013.01); *F04B 39/12* (2013.01); *F04B 39/123* (2013.01);
(Continued)

(58) Field of Classification Search
CPC .. F25B 2700/21152; F25B 2700/21163; F25B 49/022
See application file for complete search history.

(56) References Cited

U.S. PATENT DOCUMENTS 2,883,255 A    4/1959  Anderson
2,981,076 A    4/1961  Gaugler
(Continued)

FOREIGN PATENT DOCUMENTS

CN    1051080 A    5/1991
CN    1284609 A    2/2001
(Continued)

OTHER PUBLICATIONS

Machine Translation of JP 01-167556 to Fukushima et al. "Refrigerator", Jul. 1989, description, eSpacenet.*

(Continued)

*Primary Examiner* — Filip Zec
(74) *Attorney, Agent, or Firm* — Harness, Dickey & Pierce, P.L.C.

(57) ABSTRACT

A system and method for a compressor includes a compressor connected to a condenser, a discharge line temperature sensor that outputs a discharge line temperature signal corresponding to a discharge line temperature of refrigerant leaving the compressor, and a control module connected to the discharge line temperature sensor. The control module determines a saturated condenser temperature, calculates a discharge superheat temperature based on the saturated condenser temperature and the discharge line temperature, and monitors a flood back condition of the compressor by comparing the discharge superheat temperature with a predetermined threshold. The control module increases a speed of the compressor when the discharge superheat temperature is less than or equal to the predetermined threshold.

10 Claims, 17 Drawing Sheets

Related U.S. Application Data continuation of application No. 13/893,493, filed on May 14, 2013, now Pat. No. 9,494,158, which is a continuation of application No. 12/246,959, filed on Oct. 7, 2008, now Pat. No. 8,459,053.

(60) Provisional application No. 60/978,258, filed on Oct. 8, 2007.

(51) Int. Cl.

| | | |
|---|---|---|
| *F04B 39/06* | (2006.01) | |
| *F04B 39/12* | (2006.01) | |
| *F04B 49/06* | (2006.01) | |
| *F04C 18/02* | (2006.01) | |
| *F04C 23/00* | (2006.01) | |
| *F04C 28/08* | (2006.01) | |
| *F04C 28/24* | (2006.01) | |
| *F04C 29/00* | (2006.01) | |
| *F25B 49/02* | (2006.01) | |
| *F25B 31/00* | (2006.01) | |

(52) U.S. Cl.
CPC .......... *F04B 49/06* (2013.01); *F04C 18/0215* (2013.01); *F04C 23/008* (2013.01); *F04C 28/08* (2013.01); *F04C 28/24* (2013.01); *F04C 29/0085* (2013.01); *F25B 49/005* (2013.01); *F25B 49/022* (2013.01); *F04B 2203/0204* (2013.01); *F04B 2203/0209* (2013.01); *F04C 2210/227* (2013.01); *F04C 2210/26* (2013.01); *F04C 2240/403* (2013.01); *F04C 2240/803* (2013.01); *F04C 2240/81* (2013.01); *F04C 2270/19* (2013.01); *F04C 2270/80* (2013.01); *F25B 31/006* (2013.01); *F25B 2500/08* (2013.01); *F25B 2500/19* (2013.01); *F25B 2500/28* (2013.01); *F25B 2600/021* (2013.01); *F25B 2600/025* (2013.01); *F25B 2600/2513* (2013.01); *F25B 2700/151* (2013.01); *F25B 2700/1931* (2013.01); *F25B 2700/21* (2013.01); *F25B 2700/21151* (2013.01); *F25B 2700/21152* (2013.01); *F25B 2700/21163* (2013.01); *F25B 2700/21174* (2013.01); *Y02B 30/70* (2013.01); *Y10T 137/0318* (2015.04); *Y10T 137/85986* (2015.04)

(56) References Cited

U.S. PATENT DOCUMENTS

| | | | |
|---|---|---|---|
| 3,082,609 A | 3/1963 | Ryan et al. | |
| 3,242,321 A | 3/1966 | Chope | |
| 3,265,948 A | 8/1966 | Sones et al. | |
| 3,600,657 A | 8/1971 | Pfaff et al. | |
| 3,723,823 A | 3/1973 | Lit et al. | |
| 3,786,650 A * | 1/1974 | Newton | F24F 5/001 62/209 |
| 3,940,665 A | 2/1976 | Seki | |
| 4,130,997 A | 12/1978 | Hara et al. | |
| 4,131,331 A | 12/1978 | Kendall, Jr. | |
| 4,280,910 A | 7/1981 | Baumann | |
| 4,370,564 A | 1/1983 | Matsushita | |
| 4,448,038 A | 5/1984 | Barbier | |
| 4,459,519 A | 7/1984 | Erdman | |
| 4,460,861 A | 7/1984 | Rosa | |
| 4,461,153 A | 7/1984 | Lindner et al. | |
| 4,507,936 A | 4/1985 | Yoshino | |
| 4,527,399 A | 7/1985 | Lord | |
| 4,546,405 A | 10/1985 | Hultmark et al. | |
| 4,602,678 A | 7/1986 | Fick | |
| 4,653,280 A | 3/1987 | Hansen et al. | |
| 4,697,132 A | 9/1987 | Ronk et al. | |
| 4,706,469 A | 11/1987 | Oguni et al. | |
| 4,720,981 A | 1/1988 | Heit et al. | |
| 4,750,338 A | 6/1988 | Hingst | |
| 4,763,225 A | 8/1988 | Frenkel et al. | |
| 4,858,069 A | 8/1989 | Hughes | |
| 4,899,256 A | 2/1990 | Sway-Tin | |
| 4,940,929 A | 7/1990 | Williams | |
| 4,974,427 A | 12/1990 | Diab | |
| 5,056,712 A | 10/1991 | Enck | |
| 5,058,389 A | 10/1991 | Yasuda et al. | |
| 5,058,390 A | 10/1991 | Sindermann et al. | |
| 5,182,918 A | 2/1993 | Manz et al. | |
| 5,203,178 A | 4/1993 | Shyu | |
| 5,220,809 A | 6/1993 | Voss | |
| 5,255,529 A | 10/1993 | Powell et al. | |
| 5,258,901 A | 11/1993 | Fraidlin | |
| 5,269,146 A | 12/1993 | Kerner | |
| 5,291,115 A | 3/1994 | Ehsani | |
| 5,315,214 A | 5/1994 | Lesea | |
| 5,347,467 A | 9/1994 | Staroselsky et al. | |
| 5,359,276 A | 10/1994 | Mammano | |
| 5,359,281 A | 10/1994 | Barrow et al. | |
| 5,410,221 A | 4/1995 | Mattas et al. | |
| 5,410,235 A | 4/1995 | Ehsani | |
| 5,425,246 A | 6/1995 | Bessler | |
| 5,426,952 A | 6/1995 | Bessler | |
| 5,428,965 A | 7/1995 | Grunwald et al. | |
| 5,440,218 A | 8/1995 | Oldenkamp | |
| 5,482,109 A | 1/1996 | Kunkel | |
| 5,502,970 A | 4/1996 | Rajendran | |
| 5,506,930 A | 4/1996 | Umida | |
| 5,519,300 A | 5/1996 | Leon et al. | |
| 5,524,449 A | 6/1996 | Ueno et al. | |
| 5,603,222 A | 2/1997 | Dube | |
| 5,603,227 A | 2/1997 | Holden et al. | |
| 5,646,499 A | 7/1997 | Doyama et al. | |
| 5,663,627 A | 9/1997 | Ogawa | |
| 5,712,551 A | 1/1998 | Lee | |
| 5,712,802 A | 1/1998 | Kumar et al. | |
| 5,729,995 A | 3/1998 | Tajima | |
| 5,742,103 A | 4/1998 | Ashok | |
| 5,786,992 A | 7/1998 | Vinciarelli et al. | |
| 5,829,516 A | 11/1998 | Lavochkin | |
| 5,898,572 A | 4/1999 | Shennib et al. | |
| 5,903,138 A | 5/1999 | Hwang et al. | |
| 5,960,207 A | 9/1999 | Brown | |
| 5,963,442 A | 10/1999 | Yoshida et al. | |
| 5,975,854 A | 11/1999 | Culp, III et al. | |
| 6,005,365 A | 12/1999 | Kaneko et al. | |
| 6,028,406 A | 2/2000 | Birk | |
| 6,035,653 A | 3/2000 | Itoh et al. | |
| 6,041,609 A | 3/2000 | Hornsleth et al. | |
| 6,047,557 A | 4/2000 | Pham et al. | |
| 6,065,298 A | 5/2000 | Fujimoto | |
| 6,073,457 A | 6/2000 | Kampf et al. | |
| 6,091,215 A | 7/2000 | Lovett et al. | |
| 6,091,233 A | 7/2000 | Hwang et al. | |
| 6,102,665 A | 8/2000 | Centers et al. | |
| 6,116,040 A | 9/2000 | Stark | |
| 6,123,146 A | 9/2000 | Dias | |
| 6,209,331 B1 | 4/2001 | Lake et al. | |
| 6,220,045 B1 | 4/2001 | Kim | |
| 6,222,746 B1 | 4/2001 | Kim | |
| 6,226,998 B1 | 5/2001 | Reason et al. | |
| 6,236,183 B1 | 5/2001 | Schroeder | |
| 6,236,193 B1 | 5/2001 | Paul | |
| 6,259,614 B1 | 7/2001 | Ribarich et al. | |
| 6,281,656 B1 | 8/2001 | Masaki et al. | |
| 6,281,658 B1 | 8/2001 | Han et al. | |
| 6,302,654 B1 | 10/2001 | Millet et al. | |
| 6,316,918 B1 | 11/2001 | Underwood et al. | |
| 6,318,100 B1 | 11/2001 | Brendel et al. | |
| 6,318,101 B1 | 11/2001 | Pham et al. | |
| 6,321,549 B1 | 11/2001 | Reason et al. | |
| 6,326,750 B1 | 12/2001 | Marcinkiewicz | |
| 6,341,496 B1 | 1/2002 | Kettner | |
| 6,344,725 B2 | 2/2002 | Kaitani et al. | |
| 6,370,888 B1 | 4/2002 | Grabon | |
| 6,373,200 B1 | 4/2002 | Nerone et al. | |
| 6,396,229 B1 | 5/2002 | Sakamoto et al. | |

(56) References Cited

U.S. PATENT DOCUMENTS

| | | |
|---|---|---|
| 6,404,154 B2 | 6/2002 | Marcinkiewicz et al. |
| 6,406,265 B1 | 6/2002 | Hahn et al. |
| 6,414,462 B2 | 7/2002 | Chong |
| 6,434,960 B1 | 8/2002 | Rousseau |
| 6,438,978 B1 | 8/2002 | Bessler |
| 6,446,618 B1 | 9/2002 | Hill |
| 6,462,492 B1 | 10/2002 | Sakamoto et al. |
| 6,471,486 B1 | 10/2002 | Centers et al. |
| 6,477,053 B1 | 11/2002 | Zeidan et al. |
| 6,523,361 B2 | 2/2003 | Higashiyama |
| 6,532,754 B2 | 3/2003 | Haley et al. |
| 6,539,734 B1 | 4/2003 | Weyna |
| 6,542,359 B2 | 4/2003 | Babcock et al. |
| 6,578,373 B1 | 6/2003 | Barbier |
| 6,583,593 B2 | 6/2003 | Iijima et al. |
| 6,587,338 B2 | 7/2003 | Lacroix et al. |
| 6,604,372 B2 | 8/2003 | Baumert et al. |
| 6,615,594 B2 | 9/2003 | Jayanth et al. |
| 6,636,011 B2 | 10/2003 | Sadasivam et al. |
| 6,655,172 B2 | 12/2003 | Perevozchikov et al. |
| 6,661,664 B2 | 12/2003 | Sarno et al. |
| 6,670,784 B2 | 12/2003 | Odachi et al. |
| 6,688,124 B1 | 2/2004 | Stark et al. |
| 6,698,217 B2 | 3/2004 | Tanimoto et al. |
| 6,708,507 B1 | 3/2004 | Sem et al. |
| 6,708,521 B2 | 3/2004 | Wurth |
| 6,711,911 B1 | 3/2004 | Grabon et al. |
| 6,714,425 B2 | 3/2004 | Yamada et al. |
| 6,735,284 B2 | 5/2004 | Cheong et al. |
| 6,749,404 B2 | 6/2004 | Gennami et al. |
| 6,753,670 B2 | 6/2004 | Kadah |
| 6,756,753 B1 | 6/2004 | Marcinkiewicz |
| 6,756,757 B2 | 6/2004 | Marcinkiewicz et al. |
| 6,758,050 B2 | 7/2004 | Jayanth et al. |
| 6,767,851 B1 | 7/2004 | Rokman et al. |
| 6,788,024 B2 | 9/2004 | Kaneko et al. |
| 6,815,925 B2 | 11/2004 | Chen et al. |
| 6,825,637 B2 | 11/2004 | Kinpara et al. |
| 6,828,751 B2 | 12/2004 | Sadasivam et al. |
| 6,831,439 B2 | 12/2004 | Won et al. |
| 6,833,990 B2 | 12/2004 | LaCroix et al. |
| 6,857,845 B2 | 2/2005 | Stabley et al. |
| 6,876,171 B2 | 4/2005 | Lee |
| 6,898,072 B2 | 5/2005 | Beihoff et al. |
| 6,915,646 B2 | 7/2005 | Kadle et al. |
| 6,955,039 B2 | 10/2005 | Nomura et al. |
| 6,966,759 B2 | 11/2005 | Hahn et al. |
| 6,967,851 B2 | 11/2005 | Yang et al. |
| 6,982,533 B2 | 1/2006 | Seibel et al. |
| 6,984,948 B2 | 1/2006 | Nakata et al. |
| 7,005,829 B2 | 2/2006 | Schnetzka |
| RE39,060 E | 4/2006 | Okui et al. |
| 7,049,774 B2 | 5/2006 | Chin et al. |
| 7,095,208 B2 | 8/2006 | Kawaji et al. |
| 7,096,681 B2 | 8/2006 | Wills et al. |
| 7,130,196 B2 | 10/2006 | Thomas et al. |
| 7,138,777 B2 | 11/2006 | Won et al. |
| 7,143,594 B2 | 12/2006 | Ludwig et al. |
| 7,154,237 B2 | 12/2006 | Welchko et al. |
| 7,176,644 B2 | 2/2007 | Ueda et al. |
| 7,180,273 B2 | 2/2007 | Bocchiola et al. |
| 7,184,902 B2 | 2/2007 | El-Ibiary |
| 7,208,895 B2 | 4/2007 | Marcinkiewicz et al. |
| 7,234,305 B2 | 6/2007 | Nomura et al. |
| 7,251,133 B2 | 7/2007 | Wallace |
| 7,272,018 B2 | 9/2007 | Yamada et al. |
| 7,295,436 B2 | 11/2007 | Cheon |
| 7,307,401 B2 | 12/2007 | Gataric et al. |
| 7,342,379 B2 | 3/2008 | Marcinkiewicz et al. |
| 7,375,485 B2 | 5/2008 | Shahi et al. |
| 7,391,610 B2 | 6/2008 | Schultz et al. |
| 7,458,223 B2 | 12/2008 | Pham |
| 7,495,410 B2 | 2/2009 | Zargari et al. |
| 7,525,798 B2 | 4/2009 | Schultz et al. |
| 7,554,271 B2 | 6/2009 | Thiery et al. |
| 7,580,272 B2 | 8/2009 | Taguchi et al. |
| 7,595,613 B2 | 9/2009 | Thompson et al. |
| 7,605,570 B2 | 10/2009 | Liu et al. |
| 7,613,018 B2 | 11/2009 | Lim et al. |
| 7,628,028 B2 | 12/2009 | Tolbert, Jr. et al. |
| 7,639,500 B2 | 12/2009 | Lang et al. |
| 7,644,591 B2 | 1/2010 | Singh et al. |
| 7,660,139 B2 | 2/2010 | Garabandic |
| 7,667,986 B2 | 2/2010 | Artusi et al. |
| 7,673,389 B2 | 3/2010 | Lehman et al. |
| 7,675,759 B2 | 3/2010 | Artusi et al. |
| 7,683,568 B2 | 3/2010 | Pande et al. |
| 7,688,608 B2 | 3/2010 | Oettinger et al. |
| 7,706,143 B2 | 4/2010 | Lang et al. |
| 7,723,964 B2 | 5/2010 | Taguchi |
| 7,733,678 B1 | 6/2010 | Notohamiprodjo et al. |
| 7,738,228 B2 | 6/2010 | Taylor |
| 7,782,033 B2 | 8/2010 | Turchi et al. |
| 7,821,237 B2 | 10/2010 | Melanson |
| 7,895,003 B2 | 2/2011 | Caillat |
| 7,905,702 B2 | 3/2011 | Stabley et al. |
| 8,418,483 B2 | 4/2013 | McSweeney et al. |
| 8,448,459 B2 | 5/2013 | McSweeney et al. |
| 8,459,053 B2 | 6/2013 | Pham et al. |
| 8,539,786 B2 | 9/2013 | McSweeney |
| 8,849,613 B2 | 9/2014 | Caillat |
| 8,950,201 B2 | 2/2015 | Voorhis |
| 8,950,206 B2 | 2/2015 | Caillat |
| 9,021,823 B2 | 5/2015 | Caillat |
| 9,057,549 B2 | 6/2015 | McSweeney |
| 9,121,407 B2* | 9/2015 | Pham .................... F25B 49/005 |
| 9,140,728 B2* | 9/2015 | Jayanth .................... F04D 27/02 |
| 9,241,427 B1 | 1/2016 | Stevens et al. |
| 9,476,625 B2 | 10/2016 | McSweeney |
| 9,494,158 B2 | 11/2016 | Pham et al. |
| 9,494,354 B2 | 11/2016 | McSweeney et al. |
| 9,541,907 B2 | 1/2017 | McSweeney |
| 9,683,563 B2 | 6/2017 | Caillat |
| 10,077,774 B2 | 9/2018 | Seibel et al. |
| 10,337,964 B2* | 7/2019 | Kriss .................... F24F 3/1603 |
| 2001/0022939 A1 | 9/2001 | Morita et al. |
| 2002/0047635 A1 | 4/2002 | Ribarich et al. |
| 2002/0062656 A1 | 5/2002 | Suitou et al. |
| 2002/0108384 A1 | 8/2002 | Higashiyama |
| 2002/0117989 A1 | 8/2002 | Kawabata et al. |
| 2002/0157408 A1 | 10/2002 | Egawa et al. |
| 2002/0162339 A1 | 11/2002 | Harrison et al. |
| 2003/0019221 A1 | 1/2003 | Rossi et al. |
| 2003/0077179 A1 | 4/2003 | Collins et al. |
| 2003/0085621 A1 | 5/2003 | Potega |
| 2003/0094004 A1 | 5/2003 | Pham et al. |
| 2003/0146290 A1 | 8/2003 | Wang et al. |
| 2003/0182956 A1 | 10/2003 | Kurita et al. |
| 2004/0011020 A1 | 1/2004 | Nomura et al. |
| 2004/0061472 A1 | 4/2004 | Won et al. |
| 2004/0070364 A1 | 4/2004 | Cheong et al. |
| 2004/0085785 A1 | 5/2004 | Taimela |
| 2004/0100221 A1 | 5/2004 | Fu |
| 2004/0107716 A1 | 6/2004 | Hirota |
| 2004/0119434 A1 | 6/2004 | Dadd |
| 2004/0183491 A1 | 9/2004 | Sidey |
| 2004/0221594 A1 | 11/2004 | Suzuki et al. |
| 2004/0261431 A1 | 12/2004 | Singh et al. |
| 2004/0261448 A1 | 12/2004 | Nishijima et al. |
| 2005/0047179 A1 | 3/2005 | Lesea |
| 2005/0052843 A1 | 3/2005 | Baker et al. |
| 2005/0115257 A1 | 6/2005 | Goth et al. |
| 2005/0204760 A1 | 9/2005 | Kurita et al. |
| 2005/0210900 A1 | 9/2005 | Oomura et al. |
| 2005/0235660 A1 | 10/2005 | Pham |
| 2005/0235661 A1 | 10/2005 | Pham |
| 2005/0235662 A1 | 10/2005 | Pham |
| 2005/0235663 A1 | 10/2005 | Pham |
| 2005/0235664 A1 | 10/2005 | Pham |
| 2005/0247073 A1 | 11/2005 | Hikawa et al. |
| 2005/0262849 A1 | 12/2005 | Nomura et al. |
| 2005/0268631 A1 | 12/2005 | Matsunaga et al. |
| 2005/0270814 A1 | 12/2005 | Oh |
| 2006/0041335 A9 | 2/2006 | Rossi et al. |

(56) References Cited

U.S. PATENT DOCUMENTS

| | | |
|---|---|---|
| 2006/0042276 A1 | 3/2006 | Doll et al. |
| 2006/0048530 A1 | 3/2006 | Jun et al. |
| 2006/0056210 A1 | 3/2006 | Yamada et al. |
| 2006/0090490 A1 | 5/2006 | Grimm et al. |
| 2006/0117773 A1 | 6/2006 | Street et al. |
| 2006/0123809 A1 | 6/2006 | Ha et al. |
| 2006/0130501 A1 | 6/2006 | Singh et al. |
| 2006/0130504 A1 | 6/2006 | Agrawal et al. |
| 2006/0150651 A1 | 7/2006 | Goto et al. |
| 2006/0158912 A1 | 7/2006 | Wu et al. |
| 2006/0185373 A1 | 8/2006 | Butler et al. |
| 2006/0187693 A1 | 8/2006 | Tang |
| 2006/0198172 A1 | 9/2006 | Wood |
| 2006/0198744 A1 | 9/2006 | Lifson et al. |
| 2006/0247895 A1 | 11/2006 | Jayanth |
| 2006/0255772 A1 | 11/2006 | Chen |
| 2006/0261830 A1 | 11/2006 | Taylor |
| 2006/0290302 A1 | 12/2006 | Marcinkiewicz et al. |
| 2007/0012052 A1 | 1/2007 | Butler et al. |
| 2007/0029987 A1 | 2/2007 | Li |
| 2007/0040524 A1 | 2/2007 | Sarlioglu et al. |
| 2007/0040534 A1 | 2/2007 | Ghosh et al. |
| 2007/0089424 A1 | 4/2007 | Venkataramani et al. |
| 2007/0118307 A1 | 5/2007 | El-Ibiary |
| 2007/0118308 A1 | 5/2007 | El-Ibiary |
| 2007/0132437 A1 | 6/2007 | Scollo et al. |
| 2007/0144354 A1 | 6/2007 | Muller et al. |
| 2007/0186581 A1 | 8/2007 | Mistry et al. |
| 2007/0289322 A1 | 12/2007 | Mathews |
| 2008/0060791 A1 | 3/2008 | Strobel et al. |
| 2008/0089792 A1 | 4/2008 | Bae et al. |
| 2008/0110610 A1 | 5/2008 | Lifson et al. |
| 2008/0112823 A1 | 5/2008 | Yoshida et al. |
| 2008/0143289 A1 | 6/2008 | Marcinkiewicz et al. |
| 2008/0160840 A1 | 7/2008 | Bax et al. |
| 2008/0180055 A1 | 7/2008 | Zargari et al. |
| 2008/0209925 A1 | 9/2008 | Pham |
| 2008/0216494 A1 | 9/2008 | Pham et al. |
| 2008/0232065 A1 | 9/2008 | Lang et al. |
| 2008/0245083 A1 | 10/2008 | Tutunoglu et al. |
| 2008/0252269 A1 | 10/2008 | Feldtkeller et al. |
| 2008/0265847 A1 | 10/2008 | Woo et al. |
| 2008/0272745 A1 | 11/2008 | Melanson |
| 2008/0272747 A1 | 11/2008 | Melanson |
| 2008/0273356 A1 | 11/2008 | Melanson |
| 2008/0284399 A1 | 11/2008 | Oettinger et al. |
| 2008/0285318 A1 | 11/2008 | Tan et al. |
| 2009/0015214 A1 | 1/2009 | Chen |
| 2009/0015225 A1 | 1/2009 | Turchi et al. |
| 2009/0016087 A1 | 1/2009 | Shimizu |
| 2009/0027851 A1 | 1/2009 | Doczy et al. |
| 2009/0033296 A1 | 2/2009 | Hammerstrom |
| 2009/0039852 A1 | 2/2009 | Fishelov et al. |
| 2009/0059625 A1 | 3/2009 | Viitanen et al. |
| 2009/0071175 A1 | 3/2009 | Pham |
| 2009/0085510 A1 | 4/2009 | Pande et al. |
| 2009/0090113 A1 | 4/2009 | Caillat |
| 2009/0090117 A1 | 4/2009 | McSweeney |
| 2009/0090118 A1 | 4/2009 | Pham et al. |
| 2009/0091961 A1 | 4/2009 | Hsia et al. |
| 2009/0092501 A1 | 4/2009 | Seibel |
| 2009/0092502 A1 | 4/2009 | Marcinkiewicz |
| 2009/0093911 A1 | 4/2009 | Caillat |
| 2009/0094997 A1 | 4/2009 | McSweeney |
| 2009/0094998 A1 | 4/2009 | McSweeney et al. |
| 2009/0095002 A1 | 4/2009 | McSweeney et al. |
| 2009/0112368 A1 | 4/2009 | Mann, III et al. |
| 2009/0140680 A1 | 6/2009 | Park |
| 2009/0237963 A1 | 9/2009 | Prasad et al. |
| 2009/0241592 A1 | 10/2009 | Stover |
| 2009/0243561 A1 | 10/2009 | Tan et al. |
| 2009/0255278 A1 | 10/2009 | Taras et al. |
| 2009/0273330 A1 | 11/2009 | Sisson |
| 2009/0290395 A1 | 11/2009 | Osaka |
| 2009/0295347 A1 | 12/2009 | Popescu et al. |
| 2009/0303765 A1 | 12/2009 | Shimizu et al. |
| 2009/0314018 A1 | 12/2009 | Burchill et al. |
| 2009/0316454 A1 | 12/2009 | Colbeck et al. |
| 2010/0007317 A1 | 1/2010 | Yang |
| 2010/0014326 A1 | 1/2010 | Gu et al. |
| 2010/0014329 A1 | 1/2010 | Zhang et al. |
| 2010/0052601 A1 | 3/2010 | Pummer |
| 2010/0052641 A1 | 3/2010 | Popescu et al. |
| 2010/0057263 A1 | 3/2010 | Tutunoglu |
| 2010/0079125 A1 | 4/2010 | Melanson et al. |
| 2010/0080026 A1 | 4/2010 | Zhang |
| 2010/0109615 A1 | 5/2010 | Hwang et al. |
| 2010/0109626 A1 | 5/2010 | Chen |
| 2010/0118571 A1 | 5/2010 | Saint-Pierre |
| 2010/0118576 A1 | 5/2010 | Osaka |
| 2010/0128503 A1 | 5/2010 | Liu et al. |
| 2010/0156377 A1 | 6/2010 | Siegler |
| 2010/0165683 A1 | 7/2010 | Sugawara |
| 2010/0179703 A1 | 7/2010 | Singh et al. |
| 2010/0181930 A1 | 7/2010 | Hopwood et al. |
| 2010/0187914 A1 | 7/2010 | Rada et al. |
| 2010/0202169 A1 | 8/2010 | Gaboury et al. |
| 2010/0226149 A1 | 9/2010 | Masumoto |
| 2010/0246220 A1 | 9/2010 | Irving et al. |
| 2010/0246226 A1 | 9/2010 | Ku et al. |
| 2010/0253307 A1 | 10/2010 | Chen et al. |
| 2010/0259230 A1 | 10/2010 | Boothroyd |
| 2010/0270984 A1 | 10/2010 | Park et al. |
| 2011/0138826 A1 | 6/2011 | Lifson et al. |
| 2012/0279251 A1 | 11/2012 | Kido et al. |
| 2013/0255932 A1 | 10/2013 | Doepker et al. |
| 2014/0033746 A1 | 2/2014 | McSweeney |
| 2015/0051742 A1 | 2/2015 | Caillat |
| 2017/0311486 A1 | 10/2017 | Milligan et al. |
| 2019/0017508 A1 | 1/2019 | Pham et al. |

FOREIGN PATENT DOCUMENTS

| | | |
|---|---|---|
| CN | 1382912 A | 12/2002 |
| CN | 1532474 A | 9/2004 |
| CN | 1654893 A | 8/2005 |
| CN | 1671964 A | 9/2005 |
| CN | 1677016 A | 10/2005 |
| CN | 1697954 A | 11/2005 |
| CN | 1804489 A | 7/2006 |
| CN | 1806478 A | 7/2006 |
| CN | 1830131 A | 9/2006 |
| CN | 1987258 A | 6/2007 |
| CN | 100339664 C | 9/2007 |
| CN | 101354158 A | 1/2009 |
| CN | 201348396 Y | 11/2009 |
| CN | 101821509 A | 9/2010 |
| CN | 202068704 U | 12/2011 |
| CN | 202076934 U | 12/2011 |
| CN | 202083049 U | 12/2011 |
| CN | 203258933 U | 10/2013 |
| DE | 19859340 A1 | 7/2000 |
| DE | 10036378 A1 | 5/2001 |
| DE | 10328213 A1 | 1/2005 |
| DE | 102006036282 A1 | 2/2007 |
| EP | 0697086 A1 | 2/1996 |
| EP | 0697087 A1 | 2/1996 |
| EP | 0933603 A1 | 8/1999 |
| EP | 1037001 A2 | 9/2000 |
| EP | 1146299 A | 10/2001 |
| EP | 1209362 A2 | 5/2002 |
| EP | 1541869 A1 | 6/2005 |
| EP | 1580498 A2 | 9/2005 |
| JP | 55155134 A | 12/1980 |
| JP | 61272483 A | 12/1986 |
| JP | S6277539 A | 4/1987 |
| JP | 01167556 | 7/1989 |
| JP | H01167556 A | 7/1989 |
| JP | 2004163 A | 1/1990 |
| JP | 03129255 A | 6/1991 |
| JP | 04344073 A | 11/1992 |
| JP | H05322224 A | 12/1993 |
| JP | 06159738 | 6/1994 |
| JP | H06159738 | 6/1994 |

(56) References Cited

FOREIGN PATENT DOCUMENTS

| | | |
|---|---|---|
| JP | 07035393 A | 2/1995 |
| JP | H0926246 A | 1/1997 |
| JP | 09196524 A | 7/1997 |
| JP | 10009683 A | 1/1998 |
| JP | 1998097331 | 4/1998 |
| JP | 10153353 A | 6/1998 |
| JP | 10160271 | 6/1998 |
| JP | H10160271 A | 6/1998 |
| JP | H1123075 | 1/1999 |
| JP | 11159895 A | 6/1999 |
| JP | 11287497 A | 10/1999 |
| JP | 2000002496 A | 1/2000 |
| JP | 2000205630 A | 7/2000 |
| JP | 2000297970 A | 10/2000 |
| JP | 2001026214 A | 1/2001 |
| JP | 2001317470 A | 11/2001 |
| JP | 2002013858 A | 1/2002 |
| JP | 2002243246 A | 8/2002 |
| JP | 2002372322 A | 12/2002 |
| JP | 2003074945 A | 3/2003 |
| JP | 2003156244 | 5/2003 |
| JP | 2004069295 A | 3/2004 |
| JP | 2004135491 A | 4/2004 |
| JP | 2005-003710 A | 1/2005 |
| JP | 2005132167 A | 5/2005 |
| JP | 2005282972 A | 10/2005 |
| JP | 2006170537 A | 6/2006 |
| JP | 3799732 B2 | 7/2006 |
| JP | 2006177214 A | 7/2006 |
| JP | 2006188954 | 7/2006 |
| JP | 2006188954 A | 7/2006 |
| JP | 2006233820 | 9/2006 |
| JP | 2006233820 A | 9/2006 |
| JP | 2007198230 A | 8/2007 |
| JP | 2007198705 A | 8/2007 |
| JP | 4150870 B2 | 9/2008 |
| JP | 2009264699 A | 11/2009 |
| JP | 2010266132 A | 11/2010 |
| JP | 2011033340 A | 2/2011 |
| KR | 10-1996-0024115 | 7/1996 |
| KR | 2001-0044273 A | 6/2001 |
| KR | 20010114098 A | 12/2001 |
| KR | 2003-0011415 A | 2/2003 |
| KR | 2005-0059842 A | 6/2005 |
| KR | 20050085544 A | 8/2005 |
| KR | 20070071407 A | 7/2007 |
| KR | 20090050316 A | 5/2009 |
| KR | 20090052668 A | 5/2009 |
| WO | WO-9523943 A1 | 9/1995 |
| WO | WO-9523944 A1 | 9/1995 |
| WO | WO-9702729 A1 | 1/1997 |
| WO | WO-9911987 A1 | 3/1999 |
| WO | WO-9913225 A1 | 3/1999 |
| WO | WO-02/090840 A2 | 11/2002 |
| WO | WO-02/090913 A1 | 11/2002 |
| WO | WO-02090842 A2 | 11/2002 |
| WO | WO-03038987 A1 | 5/2003 |
| WO | WO-2004059822 A1 | 7/2004 |
| WO | WO-2004083744 A1 | 9/2004 |
| WO | WO-2005101939 A1 | 10/2005 |
| WO | WO-2006023075 A2 | 3/2006 |
| WO | WO-2006057529 A2 | 6/2006 |
| WO | WO-2009045495 A1 | 4/2009 |
| WO | WO-2009048575 A1 | 4/2009 |
| WO | WO-2009048576 A1 | 4/2009 |
| WO | WO-2009048577 A2 | 4/2009 |
| WO | WO-2009048578 A1 | 4/2009 |
| WO | WO-2009048579 A2 | 4/2009 |
| WO | WO-20090048466 A1 | 4/2009 |
| WO | WO-2009048566 A3 | 5/2009 |
| WO | WO-2009151841 A1 | 12/2009 |
| WO | WO-2011083756 A1 | 7/2011 |
| WO | WO-2012028144 A2 | 3/2012 |

OTHER PUBLICATIONS

Office Action regarding European Patent Application No. 08836944.2, dated Apr. 5, 2019.
Office Action regarding European Patent Application No. 08836944.2, dated Jul. 5, 2017.
International Search Report regarding International Application No. PCT/US2008/011576 dated Mar. 23, 2009.
Written Opinion of the International Searching Authority regarding International Application No. PCT/US2008/011576 dated Mar. 20, 2009.
International Search Report regarding International Application No. PCT/US2008/011464 dated Mar. 13, 2009.
Written Opinion of the International Searching Authority regarding International Application No. PCT/US2008/011464 dated Mar. 13, 2009.
International Search Report for International Application No. PCT/US2008/011442 dated Feb. 3, 2009.
International Search Report for International Applicatoin No. PCT/US2008/011596, dated Feb. 25, 2009.
International Search Report for International Application No. PCT/US2008/011441, dated Jan. 30, 2009.
International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated Jan. 30, 2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
International Preliminary Report on Patentability for International Application No. PCT/US2008/011442, dated Apr. 7, 2010.
International Preliminary Report on Patentability for International Application No. PCT/US2008/011596, dated Apr. 13, 2010.
International Preliminary Report on Patentability for International Application No. PCT/US2008/011441, dated Apr. 7, 2010.
International Preliminary Report on Patentability for International Application No. PCT/US2008/011570, dated Apr. 13, 2010.
International Preliminary Report on Patentability for International Application No. PCT/US2008/011464, dated Apr. 7, 2010.
International Preliminary Report on Patentability for International Application No. PCT/US2008/011593, dated Apr. 13, 2010.
International Preliminary Report on Patentability for International Application No. PCT/US2008/011597, dated Apr. 13, 2010.
International Preliminary Report on Patentability for International Application No. PCT/US2008/011590, dated Apr. 13, 2010.
International Preliminary Report on Patentability for International Application No. PCT/US2008/011589, dated Apr. 13, 2010.
International Preliminary Report on Patentability for International Application No. PCT/US2008/011576, dated Apr. 13, 2010.
Notice of Allowance and Fee(s) Due and Notice of Allowability regarding U.S. Appl. No. 12/244,528, dated Sep. 7, 2010.
Supplemental Notice of Allowability regarding U.S. Appl. No. 12/244,528, dated Dec. 17, 2010.

(56) References Cited

OTHER PUBLICATIONS

Response to Rule 312 Communication regarding U.S. Appl. No. 12/244,528, dated Dec. 7, 2010.
Non-Final Office Action regarding U.S. Appl. No. 12/246,825, dated Jan. 4, 2011.
Non-Final Office Action regarding U.S. Appl. No. 12/247,033, dated Jan. 21, 2011.
Non-Final Office Action regarding U.S. Appl. No. 12/247,001, dated Feb. 25, 2011.
Non-Final Office Action regarding U.S. Appl. No. 12/244,387, dated Mar. 3, 2011.
Notification of the First Office Action from the State Intelletual Property Office of People's Republic of China regarding Chinese Application No. 200880110551.6, dated Feb. 11, 2011. Translation provided by Unitalen Attorneys At Law.
Non-Final Office Action regarding U.S. Appl. No. 12/246,893, dated Apr. 1, 2011.
Supplemental Notice of Allowability regarding U.S. Appl. No. 12/244,528, dated Jan. 12, 2011.
Interview Summary regarding U.S. Appl. No. 12/247,033, dated Mar. 25, 2011.
Interview Summary regarding U.S. Appl. No. 12/247,001, dated Mar. 25, 2011.
Notification of First Office Action from the State Intellectual Property Office of People's Republic of China regarding Chinese Patent Application No. 200880110665.0, dated Apr. 8, 2011. Translation provided by Unitalen Attorneys At Law.
Notice of Grounds for Rejection from the Korean Intellectual Property Office regarding Korean Patent Application No. 10-2010-7009374, dated May 31, 2011. Translation provided by Y.S. Change & Associates.
Final Office Action regarding U.S. Appl. No. 12/246,825, dated Jun. 14, 2011.
Office Action regarding U.S. Appl. No. 12/246,959, dated Jun. 21, 2011.
Final Office Action regarding U.S. Appl. No. 12/247,033, dated Jul. 12, 2011.
Office Action regarding U.S. Appl. No. 12/246,893, dated Aug. 1, 2011.
Final Office Action regarding U.S. Appl. No. 12/244,387, dated Aug. 17, 2011.
Final Office Action regarding U.S. Appl. No. 12/247,001, dated Sep. 1, 2011.
Office Action regarding U.S. Appl. No. 12/247,020, dated Sep. 1, 2011.
Office Action regarding U.S. Appl. No. 12/246,927, dated Sep. 6, 2011.
Final Office Action regarding U.S. Appl. No. 12/246,959, dated Oct. 12, 2011.
Notice of Final Rejection from the Korean Intellectual Property Office regarding Korean Application No. 10-2010-7009374, dated Nov. 18, 2011. Translation provided by Y.S. Chang & Associates.
Office Action regarding U.S. Appl. No. 12/246,893, dated Dec. 7, 2011.
Notification of the First Office Action from the State Intellectual Property Office of People's Republic of China regarding Chinese Patent Application No. 200880111091.9 dated Nov. 23, 2011. Translation provided by Unitalen Attorneys at Law.
Notification of Grounds for Refusal regarding Korean Patent Application No. 10-2010-7007581, dated Nov. 14, 2011. Translation provided by Y.S. Chang & Associates.
Office Action regarding U.S. Appl. No. 12/246,825, dated Oct. 12, 2011.
Notification of First Office action from the State Intellectual Property Office of People's Republic of China regarding Chinese Patent Application No. 200880110484.8, dated Dec. 23, 2011. Translation provided by Unitalen Attorneys at Law.
Notification of Grounds for Refusal regarding Korean Patent Application No. 10-2010-7007583 from the Korean Intellectual Property Office, dated Dec. 28, 2011. Translation provided by Y.S. Chang & Associates.
Non-Final Office Action regarding U.S. Appl. No. 12/247,033, dated Jan. 19, 2012.
Notification of Grounds for Refusal regarding Korean Patent Application No. 10-2010-7007375, dated Dec. 7, 2011. Translation provided by Y.S. Chang & Associates.
Final Office Action regarding U.S. Appl. No. 12/244,416, dated Nov. 15, 2011.
Office Action regarding U.S. Appl. No. 12/244,416, dated Aug. 8, 2011.
Office Action regarding U.S. Appl. No. 12/244,387, dated Mar. 1, 2012.
Notification of First Office Action from the State Intellectual Property Office of People's Republic of China regarding Chinese Patent Application No. 200880110590.6, dated Feb. 29, 2012. Translation provided by Unitalen Attorneys at Law.
Notice of Appeal from the Examiner to the Board of Patent Appeals and Interferences and Pre-Appeal Brief Request for Review regarding U.S. Appl. No. 12/247,001, dated Dec. 1, 2011.
Notice of Panel Decision from Pre-Appeal Brief Review regarding U.S. Appl. No. 12/247,001, dated Dec. 27, 2011.
Appeal Brief regarding U.S. Appl. No. 12/247,001, dated Feb. 1, 2012.
Examiner's Answer to Appellants Appeal Brief regarding U.S. Appl. No. 12/247,001, dated Mar. 26, 2012.
Notification of Grounds for Refusal regarding Korean Patent Application No. 10-2010-7009659, dated Feb. 8, 2012.
Notification of Final Rejection regarding Korean Patent Application No. 10-2010-7007375, dated Apr. 3, 2012. Translation provided by Y.S. Chang & Associates.
Notification of the Second Office Action from the State Intellectual Property Office of People's Republic of China regarding Chinese Patent Application No. 200880110665.0, dated Apr. 5, 2012. Translation provided by Unitalen Attorneys at Law.
Notification of Grounds for Refusal regarding Korean Patent Application No. 10-2010-7006707, dated May 22, 2012. Translation provided by Y.S. Chang & Associates.
Non-Final Office Action regarding U.S. Appl. No. 12/246,927, dated Jun. 6, 2012.
Final Office Action regarding U.S. Appl. No. 12/247,020, dated Jun. 6, 2012.
Non-Final Office Action regarding U.S. Appl. No. 12/246,959, dated Jun. 13, 2012.
Notification of the First Office Action from the State Intellectual Property Office of People's Republic of China regarding Chinese Patent Application No. 200880110785.0, dated May 14, 2012. Translation provided by Unitalen Attorneys at Law.
Final Office Action regarding U.S. Appl. No. 12/247,033, dated Jul. 5, 2012.
Notification of the First Office Action from the State Intellectual Property Office of People's Republic of China regarding Chinese Application No. 2008801110726, dated Jun. 5, 2012. Translation provided by Unitalen Attorneys at Law.
Notification of First Office Action from the State Intellectual Property Office of People's Republic of China regarding Chinese Patent Application No. 200880110616.7, dated Jul. 4, 2012. Translation provided by Unitalen Attorneys at Law.
"Solving System of Equations by Substitution," by http://cstl.syr.edu/fipse/algebra/unit5/subst.htm, dated Aug. 30, 2012; 4 pages.
"Electrical Power vs Mechanical Power," by Suvo, http://www.brighthubengineering.com/machine-design/62310-electrical-power-vs-mechanical-power/; dated Jan. 25, 2010; 2 pages.
Applicant-Initiated Interview Summary regarding U.S. Appl. No. 12/246,927, dated Sep. 5, 2012.
Applicant-Initiated Interview Summary regarding U.S. Appl. No. 12/247,020, dated Sep. 6, 2012.
Second Office Action from the State Initellectual Property Office of People's Republic of China regarding Chinese Patent Application No. 200880110484.8, dated Aug. 17, 2012. Translation provided by Unitalen Attorneys at Law.

(56) References Cited

OTHER PUBLICATIONS

Final Office Action regarding U.S. Appl. No. 12/244,387, dated Aug. 13, 2012.
Notification of Grounds for Refusal regarding Korean Patent Application No. 10-2010-7006707, dated Oct. 23, 2012. Translation provided by Y.S. Chang & Associates.
Notice of Allowance and Fees Due regarding U.S. Appl. No. 12/247,020, dated Jan. 4, 2013.
Notice of Allowance and Fees Due regarding U.S. Appl. No. 12/246,927, dated Dec. 21, 2012.
Final Office Action regarding U.S. Appl. No. 12/246,959, dated Dec. 4, 2012.
Second Office Action from the State Intellectual Property Office of People's Republic of China regarding Chinese Patent Application No. 200880110785.0, dated Dec. 28, 2012. Translation provided by Unitalen Attorneys at Law.
Non-Final Office Action regarding U.S. Appl. No. 12/247,033, dated Jan. 29, 2013.
Notice of Allowance and Fee(s) Due regarding U.S. Appl. No. 12/246,959, dated Feb. 14, 2013.
Third Chinese Office Action from the State Intellectual Property Office of People's Republic of China regarding Chinese Patent Application No. 200880111091.9, dated Feb. 18, 2013. Translation provided by Unitalen Attorneys at Law.
Second Office Action from the State Intellectual Property Office of People's Republic of China regarding Chinese Patent Application No. 2008801110726, dated Mar. 15, 2013. Translation provided by Unitalen Attorneys at Law.
Notification of Final Rejection from Korean Intellectual Property Office regarding Korean Patent Application No. 10-2010-7006707, dated Apr. 2, 2013. Translation provided by Y.S. Chang & Associates.
Second Office Action from the State Intellectual Property Office of People's Republic of China regarding Chinese Patent Application No. 200880110616.7, dated Apr. 1, 2013. Translation provided by Unitalen Attorneys at Law.
European Search Report regarding Application No. 13161753.2-1602, dated Jul. 12, 2013.
Third Office Action from the State Intellectual Property Office of People's Republic of China regarding Chinese Patent Application No. 200880110616.7, dated Jul. 22, 2013. Translation provided by Unitalen Attorneys at Law.
Third Office Action from the State Intellectual Property Office of People's Republic of China regarding Chinese Patent Application No. 2008801110726, dated Sep. 12, 2013. Translation provided by Unitalen Attorneys at Law.
Fourth Office Action from the State Intellectual Property Office of People's Republic of China regarding Chinese Patent Application No. 200880110785.0, dated Oct. 21, 2013. Translation provided by Unitalen Attorneys at Law.
Office Action regarding U.S. Appl. No. 14/031,905, dated Dec. 13, 2013.
Decision of Rejection from the State Intellectual Property Office for People's Republic of China regarding Chinese Patent Application No. 200880110616.7, dated Nov. 27, 2013.
European Search Report regarding Application No. 08836902.0-1602 / 2198159 PCT/US2008011464, dated Apr. 4, 2014.
Notice of Allowance and Fees Due regarding U.S. Appl. No. 12/983,615 dated Feb. 28, 2014.
Second Office Action from the State Intellectual Property Office of People's Republic of China regarding Chinese Patent Application No. 201110371859.X, dated Jun. 23, 2014. Translation provided by Unitalen Attorneys at Law.
Final Office Action regarding U.S. Appl. No. 14/031,905, dated Jul. 23, 2014.
Notice of Allowance and Fees Due regarding U.S. Appl. No. 12/983,615, dated May 23, 2014.
Supplementary European Search Report regarding Application No. 08837095.2-1605 / 2195539 PCT/US2008011576, dated Nov. 25, 2014.
Extended European Search Report regarding Application No. 08837249.5-1605 / 2195540 PCT/US2008011589, dated Dec. 4, 2014.
Extended European Search Report regarding Application No. 08837777.5-1605 / 2198160 PCT/US2008011590, dated Dec. 3, 2014.
Extended European Search Report regarding Application No. 08837504.3-1605 / 2198218 PCT/US2008011597, dated Dec. 3, 2014.
Extended European Search Report regarding Application No. 08838154.6-1605 / 2195588 PCT/US2008011593, dated Dec. 4, 2014.
Extended European Search Report regarding Application No. 08836944.2-1605 / 2198165 PCT/US2008011596, dated Dec. 4, 2014.
Notice of Allowance and Fees Due regarding U.S. Appl. No. 14/031,905, dated Mar. 23, 2015.
Notice of Allowance and Fees Due regarding U.S. Appl. No. 14/031,905, dated Apr. 27, 2015.
U.S. Office Action regarding U.S. Appl. No. 13/845,784, dated May 11, 2015.
First Office Action regarding Chinese Patent Application No. 201310484685.7, dated May 20, 2015. Translation provided by Unitalen Attorneys at Law.
Search Report regarding European Patent Application No. 08835849.4-1608 / 2198157 PCT/US2008011441, dated Jun. 9, 2015.
Search Report regarding European Patent Application No. 08836567.1-1608 / 2198158 PCT/US2008011442, dated Jun. 9, 2015.
Interview Summary regarding U.S. Appl. No. 13/845,784, dated Jul. 6, 2015.
Search Report regarding European Patent Application No. 08837748.6-1608 / 2201437 PCT/US2008011570, dated Aug. 7, 2015.
Restriction Requirement regarding U.S. Appl. No. 13/893,493, dated Oct. 29, 2015.
European Search Report regarding Application No. 08837748.6-1608, dated Aug. 7, 2015.
Office Action regarding Chinese Patent Application No. 201410312784.1, dated Nov. 30, 2015. Translation provided by Unitalen Attorneys at Law.
Office Action regarding U.S. Appl. No. 14/739,207, dated Dec. 31, 2015.
Office Action regarding India Patent Application No. 536/MUMNP/2010, dated Dec. 31, 2015.
Restriction Requirement regarding U.S. Appl. No. 13/893,493, dated Mar. 29, 2016.
Office Action regarding U.S. Appl. No. 14/739,207, dated May 20, 2016.
Office Action regarding U.S. Appl. No. 13/893,493, dated Jul. 14, 2016.
Advisory Action regarding U.S. Appl. No. 14/739,207, dated Aug. 2, 2016.
Office Action regarding European Patent Application No. 08835849.4, dated Aug. 5, 2016.
Office Action regarding Chinese Patent Application No. 201410312784.1, dated Aug. 3, 2016. Translation provided by Unitalen Attorneys At Law.
Office Action regarding European Patent Application No. 08836902.0, dated Dec. 2, 2016.
Office Action regarding U.S. Appl. No. 12/246,893, dated Dec. 28, 2016.
Office Action regarding Chinese Patent Application No. 201510382548.1, dated Dec. 9, 2016. Translation provided by Unitalen Attorneys at Law.
Interview Summary regarding U.S. Appl. No. 12/246,893, dated Mar. 15, 2017.
Office Action regarding U.S. Appl. No. 12/246,893, dated Apr. 14, 2017.
Office Action regarding European Patent Application No. 08837777.5, dated Jun. 14, 2017.
Office Action regarding European Patent Application No. 08837504.3, dated Jul. 5, 2017.
Office Action regarding European Patent Application No. 08837095.2, dated Jul. 5, 2017.
Office Action regarding U.S. Appl. No. 12/246,893, dated Aug. 23, 2017.
Restriction and Election of Species Requirement regarding U.S. Appl. No. 15/346,220, dated Nov. 14, 2017.

(56) References Cited

OTHER PUBLICATIONS

Office Action regarding European Patent Application No. 08836944.2, dated Jan. 26, 2018.
Office Action regarding U.S. Appl. No. 15/346,220 dated Feb. 22, 2018.
Office Action regarding European Patent Application No. 08837095.2-1605, dated Dec. 13, 2017.
Office Action regarding European Patent Application No. 08837504.3-1009, dated Jan. 19, 2018.
Office Action regarding European Patent Application No. 08836944.2, dated Jun. 12, 2018.
Office Action regarding European Patent Application No. 08837504.3-1009, dated Nov. 20, 2018.
Office Action regarding European Patent Application No. 08837095.2-1009, dated Nov. 20, 2018.
Advisory Action regarding U.S. Appl. No. 12/244,387, dated Nov. 1, 2012.
Office Action regarding Australian Patent Application No. 2008311363, dated Feb. 15, 2011.
Office Action regarding Australian Patent Application No. 2012203057, dated May 31, 2013.
Office Action regarding Chinese Patent Application No. 200880110266.4, dated Jul. 1, 2013. Translation provided by Unitalen Attorneys at Law.
Office Action regarding Chinese Patent Application No. 200880110266.4, dated Aug. 22, 2012. Translation provided by Unitalen Attorneys at Law.
Office Action regarding Chinese Patent Application No. 200880110266.4, dated Dec. 23, 2011. Translation provided by Unitalen Attorneys at Law.
Office Action regarding Chinese Patent Application No. 200880110266.4, dated Mar. 4, 2013. Translation provided by Unitalen Attorneys at Law.
Office Action regarding Chinese Patent Application No. 201310109930.6, dated Dec. 3, 2014. Translation provided by Unitalen Attorneys At Law.
Interview Summary regarding U.S. Appl. No. 12/244,387, dated Sep. 9, 2011.
Office Action regarding U.S. Appl. No. 13/828,246, dated Feb. 19, 2016.
Restriction Requirement regarding U.S. Appl. No. 13/828,246, dated Oct. 15, 2015.
Office Action regarding Chinese Patent Application No. 201310109930.6, dated Aug. 25, 2015. Translation provided by Unitalen Attorneys at Law.
Office Action regarding U.S. Appl. No. 12/244,387, dated Mar. 21, 2013.
Office Action regarding U.S. Appl. No. 13/828,246, dated Aug. 12, 2016.
Advisory Action regarding U.S. Appl. No. 13/828,246, dated Nov. 16, 2016.
Office Action regarding Chinese Patent Application No. 201510389135.6, dated Jul. 21, 2017. Translation provided by Unitalen Attorneys at Law.
Office Action regarding Chinese Patent Application No. 200880110276.8, dated Jan. 5, 2012. Translation provided by Unitalen Attorneys at Law.
Office Action regarding Chinese Patent Application No. 200880110276.8, dated Jul. 23, 2012. Translation provided by Unitalen Attorneys at Law.
Notice of Allowance regarding U.S. Appl. No. 13/893,493, dated Sep. 26, 2016.
Notice of Allowance regarding U.S. Appl. No. 15/346,220, dated Jul. 11, 2018.
Office Action regarding Chinese Patent Application No. 200880110785.0, dated Apr. 28, 2013. Translation provided by Unitalen Attorneys at Law.
Office Action regarding European Patent Appllication No. 08836944.2, dated Nov. 20, 2018.
Notice of Allowance regarding U.S. Appl. No. 14/499,849, dated Mar. 2, 2017.
Notice of Allowance regarding U.S. Appl. No. 14/499,849, dated Apr. 18, 2017.
Interview Summary regarding U.S. Appl. No. 12/246,893, dated Jun. 15, 2011.
Interview Summary regarding U.S. Appl. No. 12/246,893, dated Oct. 25, 2011.
Office Action regarding U.S. Appl. No. 12/246,893, dated Apr. 25, 2012.
Examiner's Answer to Appeal Brief regarding U.S. Appl. No. 12/246,893, dated Nov. 26, 2012.
Patent Board Decision on Appeal regarding U.S. Appl. No. 12/246,893, dated Jul. 1, 2016.
Office Action regarding Chinese Patent Application No. 200880111091.9, dated Jul. 30, 2012. Translation provided by Unitalen Attorneys at Law.
Office Action regarding Indian Patent Application No. 539/MUMNP/2010, dated Dec. 3, 2014.
Office Action regarding Indian Patent Application No. 539/MUMNP/2010, dated Aug. 27, 2015.
Notice of Allowance regarding U.S. Appl. No. 12/244,387, dated Oct. 15, 2013.
Office Action regarding U.S. Appl. No. 14/480,350, dated Feb. 9, 2015.
Notice of Allowance regarding U.S. Appl. No. 14/480,350, dated Mar. 2, 2015.
Office Action regarding European Patent Application No. 08836902.0, dated Jun. 25, 2018.
Office Action regarding European Patent Application No. 08836902.0, dated Nov. 23, 2018.
Office Action regarding European Patent Application No. 08836902.0, dated Mar. 25, 2019.
Interview Summary regarding U.S. Appl. No. 12/246,927, dated Nov. 16, 2011.
Interview Summary regarding U.S. Appl. No. 12/246,927, dated Dec. 2, 2011.
Notice of Allowance regarding U.S. Appl. No. 13/845,784, dated Oct. 9, 2015.
Office Action regarding Chinese Patent Application No. 200880110665.0, dated Nov. 16, 2012. Translation provided by Unitalen Attorneys at Law.
Patent Board Decision regarding U.S. Appl. No. 12/247,001, dated Aug. 24, 2016.
Notice of Allowance regarding U.S. Appl. No. 12/247,001, dated Sep. 26, 2016.
Office Action regarding Chinese Patent Application No. 201110371859.X, dated Dec. 27, 2013. Translation provided by Unitalen Attorneys at Law.
Office Action regarding European Patent Application No. 08837504.3, dated Sep. 16, 2019.
Interview Summary regarding U.S. Appl. No. 12/247,020, dated Dec. 1, 2011.
Interview Summary regarding U.S. Appl. No. 12/247,020, dated Dec. 11, 2012.
Office Action regarding Chinese Patent Application No. 200880110590.6, dated Dec. 5, 2012. Translation provided by Unitalen Attorneys at Law.
Office Action regarding Chinese Patent Application No. 200880110590.6, dated Apr. 15, 2013. Translation provided by Unitalen Attorneys at Law.
Advisory Action regarding U.S. Appl. No. 12/246,825, dated Aug. 23, 2011.
Interview Summary regarding U.S. Appl. No. 12/246,825, dated Sep. 6, 2011.
Office Action regarding Indian Patent Application No. 538/MUMNP/2010, dated Jan. 29, 2016.
Office Action regarding Korean Patent Application No. 10-2010-7007052, dated Jun. 12, 2012. Translation provided by Y.S. Chang & Associates.
Office Action regarding Korean Patent Application No. 10-2010-7007052, dated Oct. 23, 2012. Translation provided by Y.S. Chang & Associates.

(56) References Cited

OTHER PUBLICATIONS

Office Action regarding Korean Patent Application No. 10-2010-7007052, dated Apr. 2, 2013. Translation provided by Y.S. Chang & Associates.
Notice of Allowance regarding U.S. Appl. No. 12/247,033, dated May 22, 2013.
Advisory Action regarding U.S. Appl. No. 14/031,905, dated Oct. 2, 2014.
Notice of Allowance regarding U.S. Appl. No. 14/739,207, dated Aug. 31, 2016.

* cited by examiner

VARIABLE SPEED COMPRESSOR PROTECTION SYSTEM AND METHOD

CROSS-REFERENCE TO RELATED APPLICATIONS

This application is a continuation of U.S. patent application Ser. No. 15/346,220, filed on Nov. 8, 2016 and issuing as U.S. Pat. No. 10,077,774, which is a continuation of U.S. patent application Ser. No. 13/893,493, filed on May 14, 2013 and issued as U.S. Pat. No. 9,494,158, which is a continuation of U.S. patent application Ser. No. 12/246,959, filed on Oct. 7, 2008 and issued as U.S. Pat. No. 8,459,053. This application claims the benefit of U.S. Provisional Application No. 60/978,258, filed on Oct. 8, 2007. The entire disclosures of each of the above applications are incorporated herein by reference.

FIELD

The present disclosure relates to compressors, and more particularly, to a protection system for use with a variable speed compressor.

BACKGROUND

The statements in this section merely provide background information related to the present disclosure and may not constitute prior art.

Compressors may be used in a wide variety of industrial and residential applications to circulate refrigerant within a refrigeration, heat pump, HVAC, or chiller system (generically "refrigeration systems") to provide a desired heating or cooling effect. In any of the foregoing applications, the compressor should provide consistent and efficient operation to insure that the particular application (i.e., refrigeration, heat pump, HVAC, or chiller system) functions properly. A variable speed compressor may be used to vary compressor capacity according to refrigeration system load.

Operation of the compressor during a flood back condition is undesirable. A flood back condition occurs when excessive liquid refrigerant flows into the compressor. Severe flood back can dilute the oil and reduce its lubrication property, leading to potential seizure. Although some mixture of liquid refrigerant and oil in the compressor may be expected, excessive mixture may cause damage to the compressor.

Likewise, operation of the compressor at excessive temperature levels may be damaging to the compressor. An overheat condition may damage internal compressor components including, for example, the electric motor.

SUMMARY

This section provides a general summary of the disclosure, and is not a comprehensive disclosure of its full scope or all of its features.

A system is provided that includes a compressor connected to a condenser and a discharge line temperature sensor that outputs a discharge line temperature signal corresponding to a discharge line temperature of refrigerant leaving the compressor. The system also includes a control module connected to the discharge line temperature sensor. The control module determines a saturated condenser temperature, calculates a discharge superheat temperature based on the saturated condenser temperature and the discharge line temperature, and monitors a flood back condition of the compressor by comparing the discharge superheat temperature with a predetermined threshold. The control module also increases a speed of the compressor when the discharge superheat temperature is less than or equal to the predetermined threshold.

A method is also provided and includes determining, with a control module, a saturated condenser temperature of a condenser connected to a compressor. The method also includes receiving, with the control module, a discharge line temperature signal that corresponds to a discharge line temperature of refrigerant leaving the compressor. The method also includes calculating, with the control module, a discharge superheat temperature based on the saturated condenser temperature and the discharge line temperature. The method also includes monitoring, with the control module, a flood back condition of the compressor by comparing the discharge superheat temperature with a predetermined threshold. The method also includes increasing a speed of the compressor when the discharge superheat temperature is less than or equal to the predetermined threshold.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
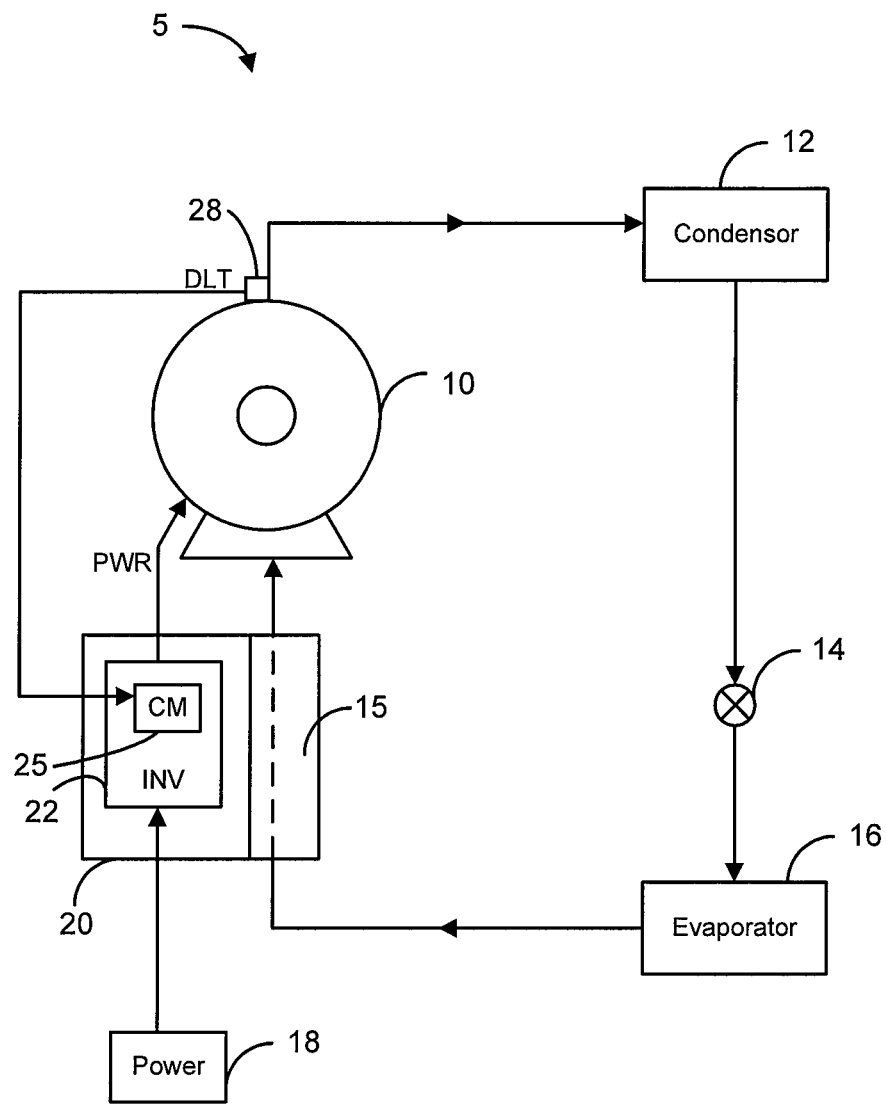
FIG. 1 is a schematic illustration of a refrigeration system.

The following description is merely exemplary in nature and is not intended to limit the present disclosure, application, or uses. It should be understood that throughout the drawings, corresponding reference numerals indicate like or corresponding parts and features.

As used herein, the terms module, control module, and controller may refer to one or more of the following: An application specific integrated circuit (ASIC), an electronic circuit, a processor (shared, dedicated, or group) and memory that execute one or more software or firmware programs, a combinational logic circuit, or other suitable components that provide the described functionality. As used herein, computer readable medium may refer to any medium capable of storing data for a computer or module, including a processor. Computer-readable medium includes, but is not limited to, memory, RAM, ROM, PROM, EPROM, EEPROM, flash memory, CD-ROM, floppy disk, magnetic tape, other magnetic medium, optical medium, or any other device or medium capable of storing data for a computer.

With reference to FIG. 1, an exemplary refrigeration system 5 includes a compressor 10 that compresses refrigerant vapor. While a specific refrigeration system is shown in FIG. 1, the present teachings are applicable to any refrigeration system, including heat pump, HVAC, and chiller systems. Refrigerant vapor from compressor 10 is delivered to a condenser 12 where the refrigerant vapor is liquefied at high pressure, thereby rejecting heat to the outside air. The liquid refrigerant exiting condenser 12 is delivered to an evaporator 16 through an expansion valve 14. Expansion valve 14 may be a mechanical or electronic valve for controlling super heat of the refrigerant. The refrigerant passes through expansion valve 14 where a pressure drop causes the high pressure liquid refrigerant to achieve a lower pressure combination of liquid and vapor. As hot air moves across evaporator 16, the low pressure liquid turns into gas, thereby removing heat from evaporator 16. The low pressure gas is again delivered to compressor 10 where it is compressed to a high pressure gas, and delivered to condenser 12 to start the refrigeration cycle again.

Figure 2:
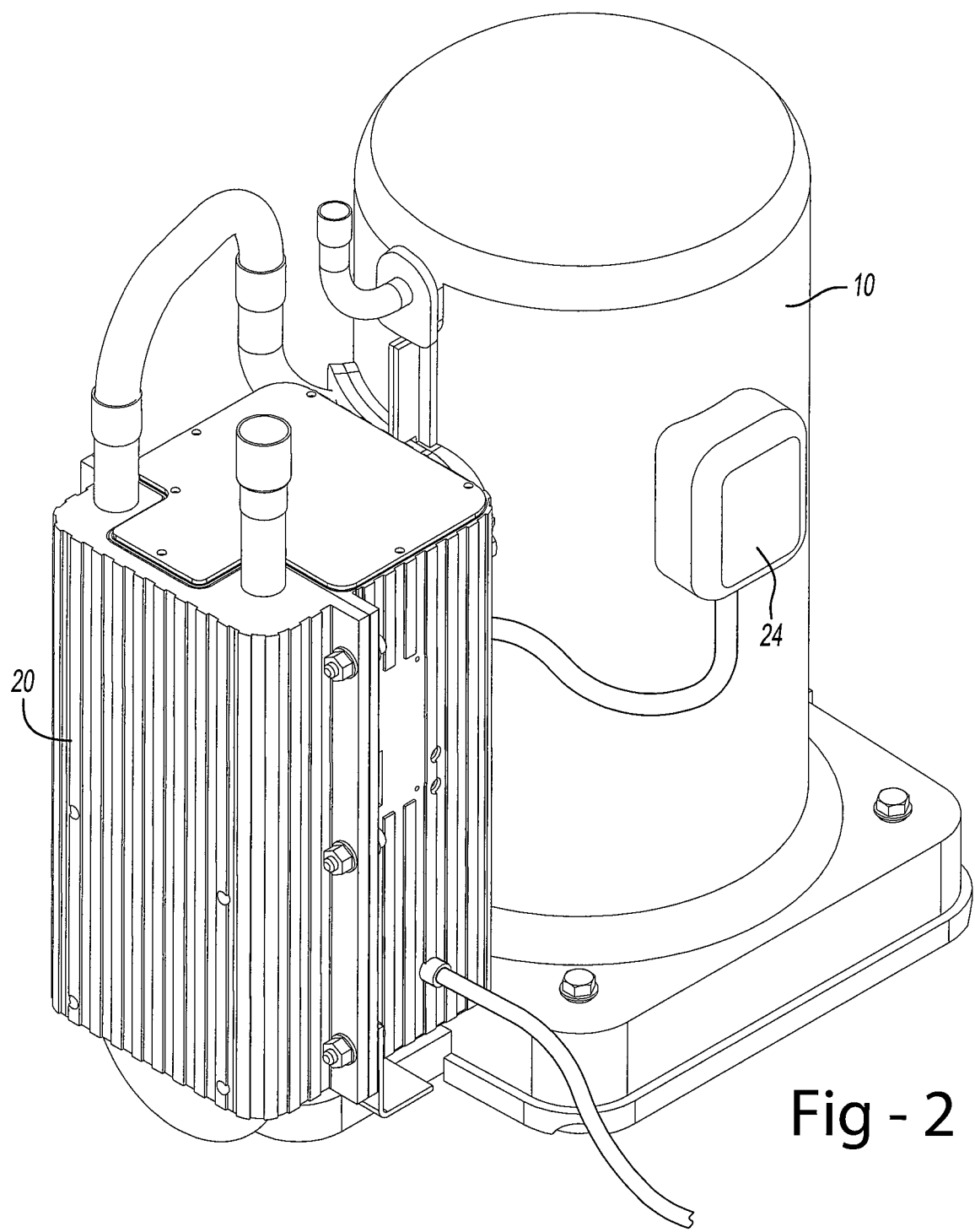
FIG. 2 is a perspective view of a compressor with an inverter drive.
Figure 3:
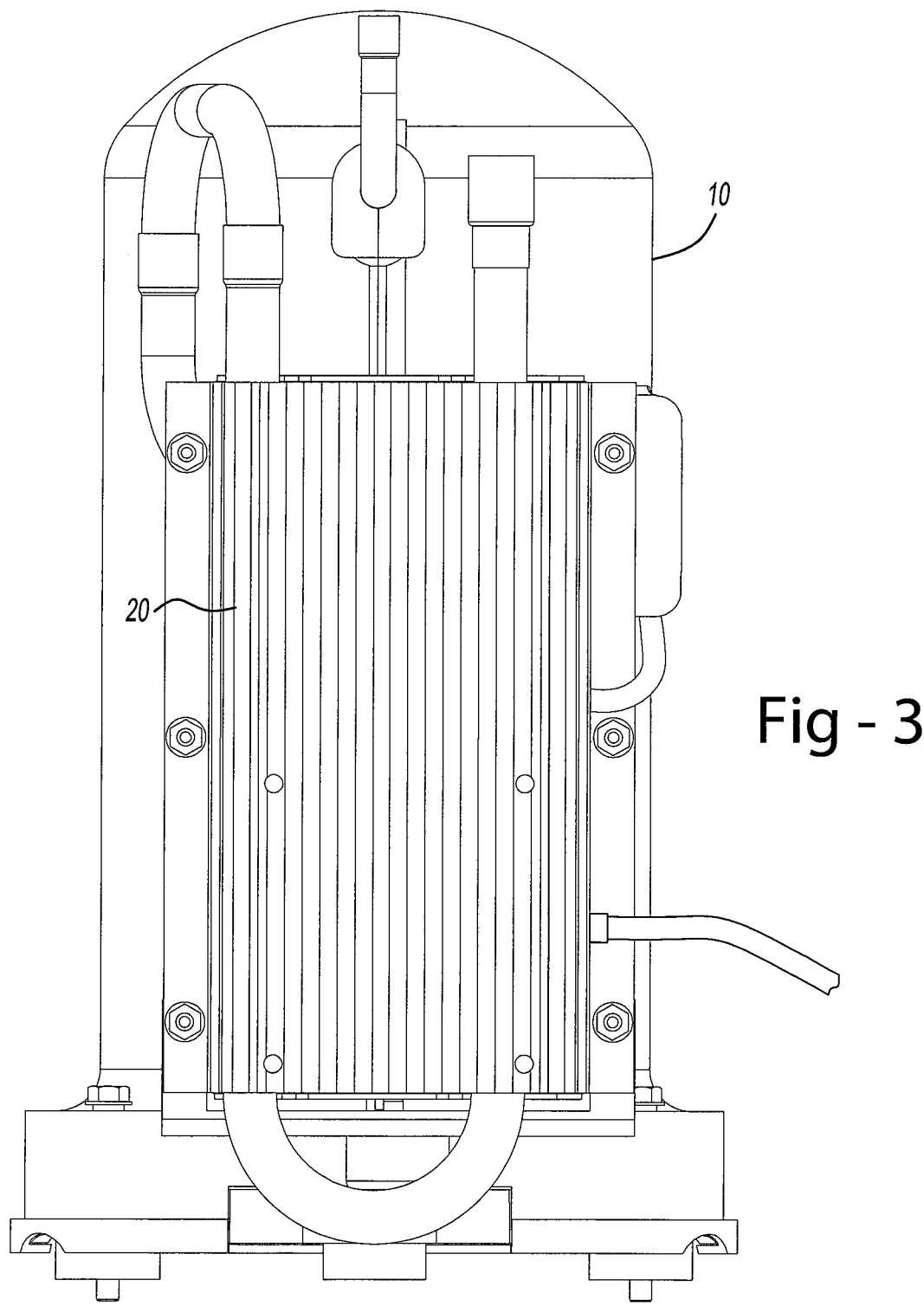
FIG. 3 is another perspective view of a compressor with an inverter driver.

With reference to FIGS. 1, 2 and 3, compressor 10 may be driven by an inverter drive 22, also referred to as a variable frequency drive (VFD), housed in an enclosure 20. Enclosure 20 may be near compressor 10. Inverter drive 22 receives electrical power from a power supply 18 and delivers electrical power to compressor 10. Inverter drive 22 includes a control module 25 with a processor and software operable to modulate and control the frequency of electrical power delivered to an electric motor of compressor 10. Control module 25 includes a computer readable medium for storing data including the software executed by the processor to modulate and control the frequency of electrical power delivered to the electric motor of compressor and the software necessary for control module 25 to execute and perform the protection and control algorithms of the present teachings. By modulating the frequency of electrical power delivered to the electric motor of compressor 10, control module 25 may thereby modulate and control the speed, and consequently the capacity, of compressor 10.

Inverter drive 22 includes solid state electronics to modulate the frequency of electrical power. Generally, inverter drive 22 converts the inputted electrical power from AC to DC, and then converts the electrical power from DC back to AC at a desired frequency. For example, inverter drive 22 may directly rectify electrical power with a full-wave rectifier bridge. Inverter driver 22 may then chop the electrical power using insulated gate bipolar transistors (IGBT's) or thyristors to achieve the desired frequency. Other suitable electronic components may be used to modulate the frequency of electrical power from power supply 18.

Electric motor speed of compressor 10 is controlled by the frequency of electrical power received from inverter driver 22. For example, when compressor 10 is driven at sixty hertz electric power, compressor 10 may operate at full capacity operation. When compressor 10 is driven at thirty hertz electric power, compressor 10 may operate at half capacity operation.

Piping from evaporator 16 to compressor 10 may be routed through enclosure 20 to cool the electronic components of inverter drive 22 within enclosure 20. Enclosure 20 may include a cold plate 15. Suction gas refrigerant may cool the cold plate prior to entering compressor 10 and thereby cool the electrical components of inverter drive 22. In this way, cold plate 15 may function as a heat exchanger between suction gas and inverter drive 22 such that heat from inverter drive 22 is transferred to suction gas prior to the suction gas entering compressor 10.

As shown in FIGS. 2 and 3, electric power from inverter drive 22 housed within enclosure 20 may be delivered to compressor 10 via a terminal box 24 attached to compressor 10.

A compressor floodback or overheat condition is undesirable and may cause damage to compressor 10 or other refrigeration system components. Suction super heat (SSH) and/or discharge super heat (DSH) may be correlated to a flood back or overheating condition of compressor 10 and may be monitored to detect and/or predict a flood back or overheating condition of compressor 10. DSH is the difference between the temperature of refrigerant vapor leaving the compressor, referred to as discharge line temperature (DLT) and the saturated condenser temperature (Tcond). Suction super heat (SSH) is the difference between the temperature of refrigerant vapor entering the compressor, referred to as suction line temperature (SLT) and saturated evaporator temperature (Tevap).

Figure 5:
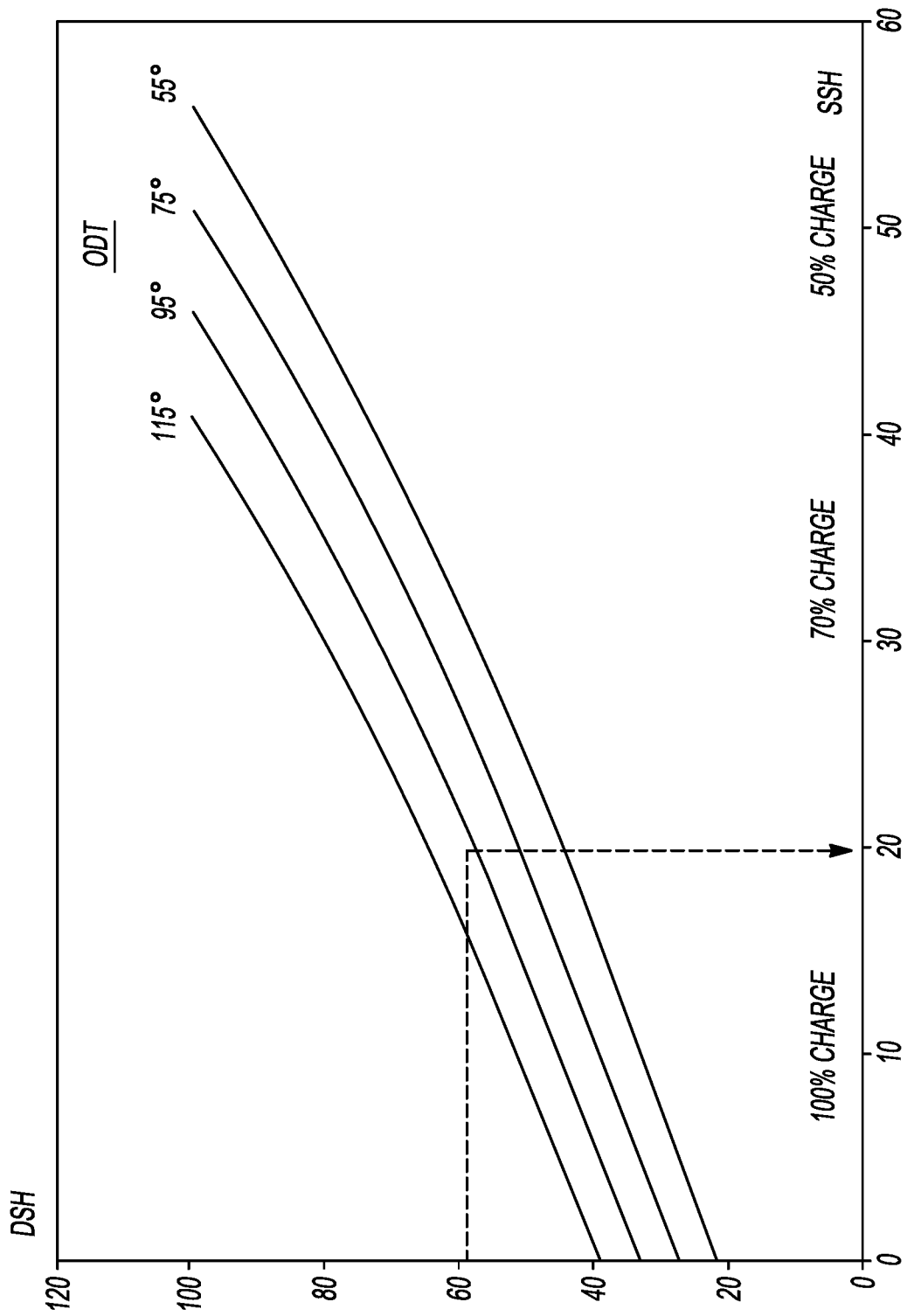
FIG. 5 is a graph showing discharge super heat correlated with suction super heat and outdoor temperature.

SSH and DSH may be correlated as shown in FIG. 5. The correlation between DSH and SSH may be particularly accurate for scroll type compressors, with outside ambient temperature being only a secondary effect. As shown in FIG. 5, correlations between DSH and SSH are shown for outdoor temperatures (ODT) of one-hundred fifteen degrees Fahrenheit, ninety-five degrees Fahrenheit, seventy-five degrees Fahrenheit, and fifty-five degrees Fahrenheit. The correlation shown in FIG. 5 is an example only and specific correlations for specific compressors may vary by compressor type, model, capacity, etc.

A flood back condition may occur when SSH is approaching zero degrees or when DSH is approaching twenty to forty degrees Fahrenheit. For this reason, DSH may be used to detect the onset of a flood back condition and its severity. When SSH is at zero degrees, SSH may not indicate the severity of the flood back condition. As the floodback condition becomes more severe, SSH remains at around zero degrees. When SSH is at zero degrees, however, DSH may be between twenty and forty degrees Fahrenheit and may more accurately indicate the severity of a flood back condition. When DSH is in the range of thirty degrees Fahrenheit to eighty degrees Fahrenheit, compressor 10 may operate within a normal range. When DSH is below thirty degrees Fahrenheit, the onset of a flood back condition may occur. When DSH is below ten degrees Fahrenheit, a severe flood back condition may occur.

With respect to overheating, when DSH is greater than eighty degrees Fahrenheit, the onset of an overheating condition may occur. When DSH is greater than one-hundred degrees Fahrenheit, a severe overheating condition may be present.

In FIG. 5, typical SSH temperatures for exemplar refrigerant charge levels are shown. For example, as the percentage of refrigerant charge in refrigeration system 5 decreases, SSH typically increases.

Figure 4:
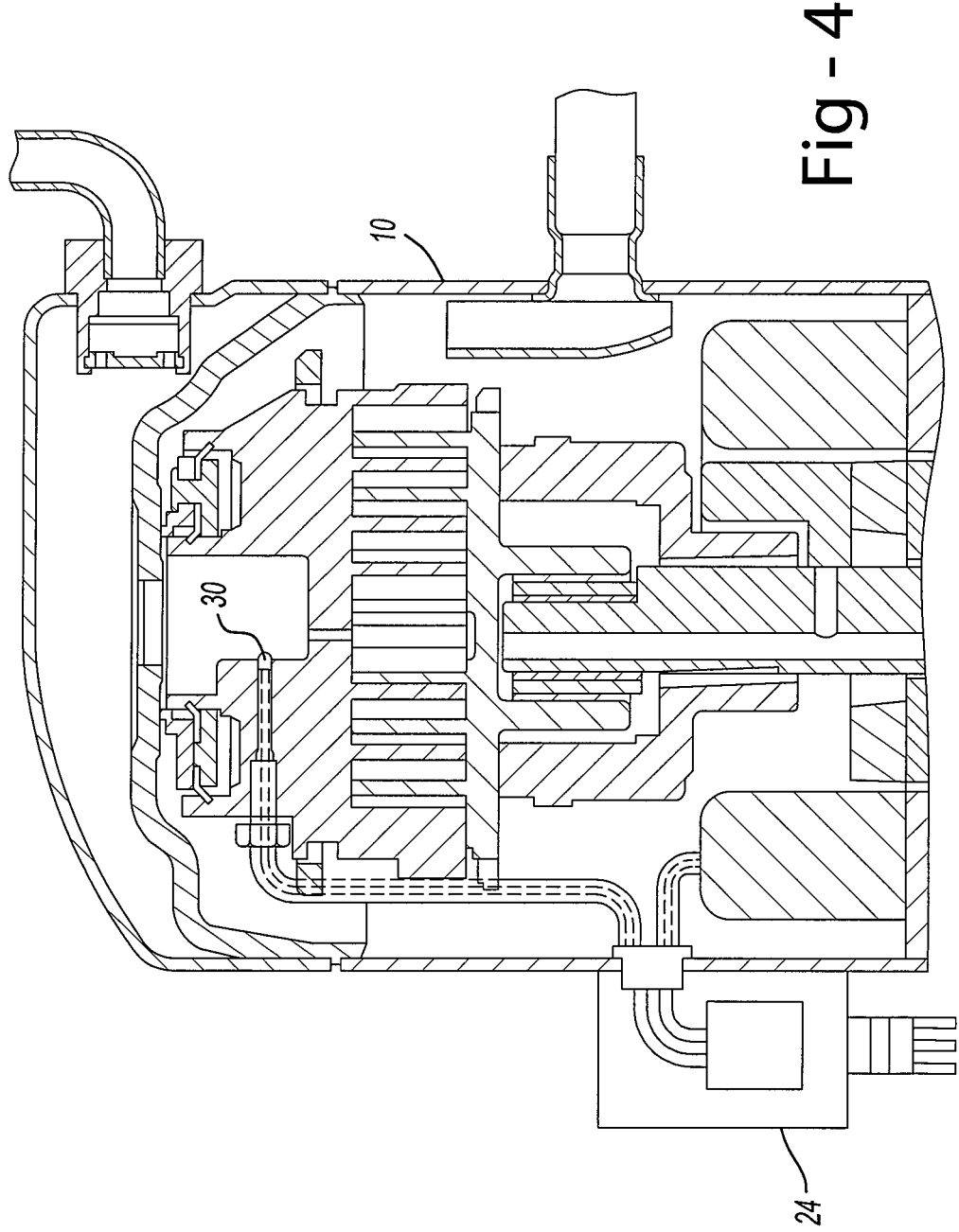
FIG. 4 is a cross-section view of a compressor.

To determine DSH, DLT may be subtracted from Tcond. DLT may be sensed by a DLT sensor 28 that senses a temperature of refrigerant exiting compressor 10. As shown in FIG. 1, DLT sensor 28 may be external to compressor 10 and may be mounted proximate a discharge outlet of compressor 10. Alternatively, an internal DLT sensor 30 may be used as shown in FIG. 4. In FIG. 4, a cross-section of compressor 10 is shown. Internal DLT sensor 30 may be embedded in an upper fixed scroll of a scroll compressor and may sense a temperature of discharge refrigerant exiting the intermeshing scrolls.

In the alternative, a combination temperature/pressure sensor may be used. In such case, Tcond may be measured based on the pressure of refrigerant exiting compressor 10 as measured by the combination sensor. Moreover, in such case, DSH may be calculated based on DLT, as measured by the temperature portion of the sensor, and on Tcond, as measured by the pressure portion of the combination sensor.

Tcond may be derived from other system parameters. Specifically, Tcond may be derived from compressor current and voltage (i.e., compressor power), compressor speed, and compressor map data associated with compressor 10. A method for deriving Tcond based on current, voltage and compressor map data for a fixed speed compressor is described in the commonly assigned application for Compressor Diagnostic and Protection System, U.S. application Ser. No. 11/059,646, Publication No. U.S. 2005/0235660. Compressor map data for a fixed speed compressor correlating compressor current and voltage to Tcond may be compressor specific and based on test data for a specific compressor type, model and capacity.

In the case of a variable speed compressor, Tcond may also be a function of compressor speed, in addition to compressor power.

Figure 6:
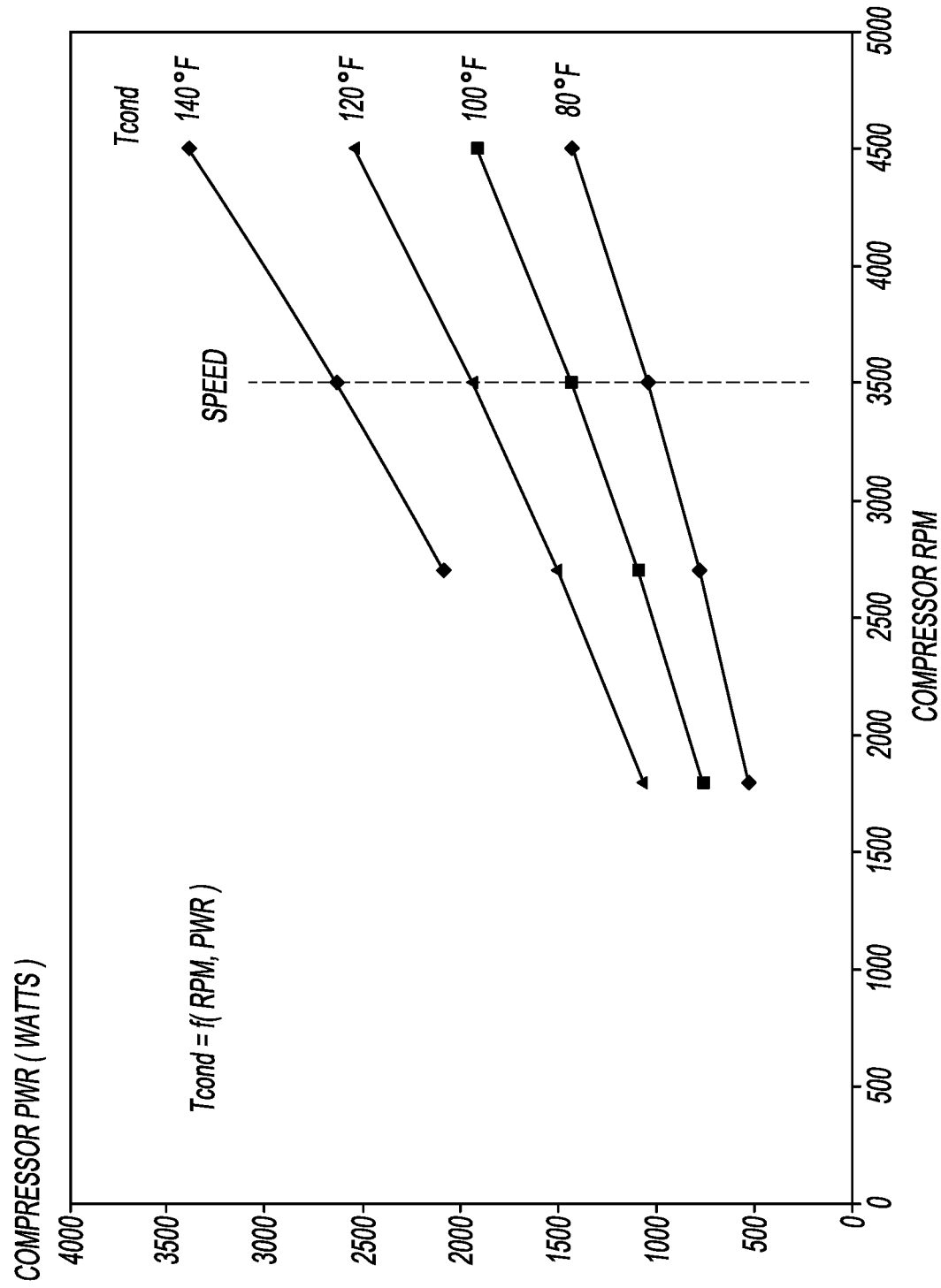
FIG. 6 is a graph showing condenser temperature correlated with compressor power and compressor speed.

A graphical correlation between compressor power in watts and compressor speed is shown in FIG. 6. As shown, Tcond is a function of compressor power and compressor speed. In this way, a three-dimensional compressor map with data correlating compressor power, compressor speed, and Tcond may be derived for a specific compressor based on test data. Compressor current may be used instead of compressor power. Compressor power, however, may be preferred over compressor current to reduce the impact of any line voltage variation. The compressor map may be stored in a computer readable medium accessible to control module 25.

In this way, control module 25 may calculate Tcond based on compressor power data and compressor speed data. Control module 25 may calculate, monitor, or detect compressor power data during the calculations performed to convert electrical power from power supply 18 to electrical power at a desired frequency. In this way, compressor power and current data may be readily available to control module 25. In addition, control module 25 may calculate, monitor, or detect compressor speed based on the frequency of electrical power delivered to the electric motor of compressor 10. In this way, compressor speed data may also be readily available to control module 25. Based on compressor power and compressor speed, control module 25 may derive Tcond.

After measuring or calculating Tcond, control module 25 may calculate DSH as the difference between Tcond and DLT, with DLT data being receiving from external DLT sensor 28 or internal DLT sensor 30.

Control module 25 may monitor DSH to detect a flood back or overheat condition, based on the correlation between DSH and flood back and overheat conditions described above. Upon detection of a flood back or overheat condition, control module 25 may adjust compressor speed or adjust expansion valve 14 accordingly. Control module 25 may communicate with or control expansion valve 14. Alternatively, control module 25 may communicate with a system controller for refrigeration system 5 and may notify system controller of the flood back or overheat condition. System controller may then adjust expansion valve or compressor speed accordingly.

DSH may be monitored to detect or predict a sudden flood back or overheat condition. A sudden reduction in DLT or DSH without significant accompanying change in Tcond may be indicative of a sudden flood back or overheat condition. For example, if DLT or DSH decreases by a predetermined temperature amount (e.g., fifty degrees Fahrenheit) within a predetermined time period (e.g., fifty seconds), a sudden flood back condition may exist. Such a condition may be caused by expansion valve 14 being stuck open. Likewise, a sudden increase in DLT or DSH with similar magnitude and without significant accompanying change in Tcond may be indicative of a sudden overheat condition due to expansion valve 14 being stuck closed. For example, if DLT or DSH increases by a predetermined temperature amount (e.g., fifty degrees Fahrenheit) within a predetermined time period (e.g., fifty seconds), a sudden overheat condition may exist.

Figure 7:
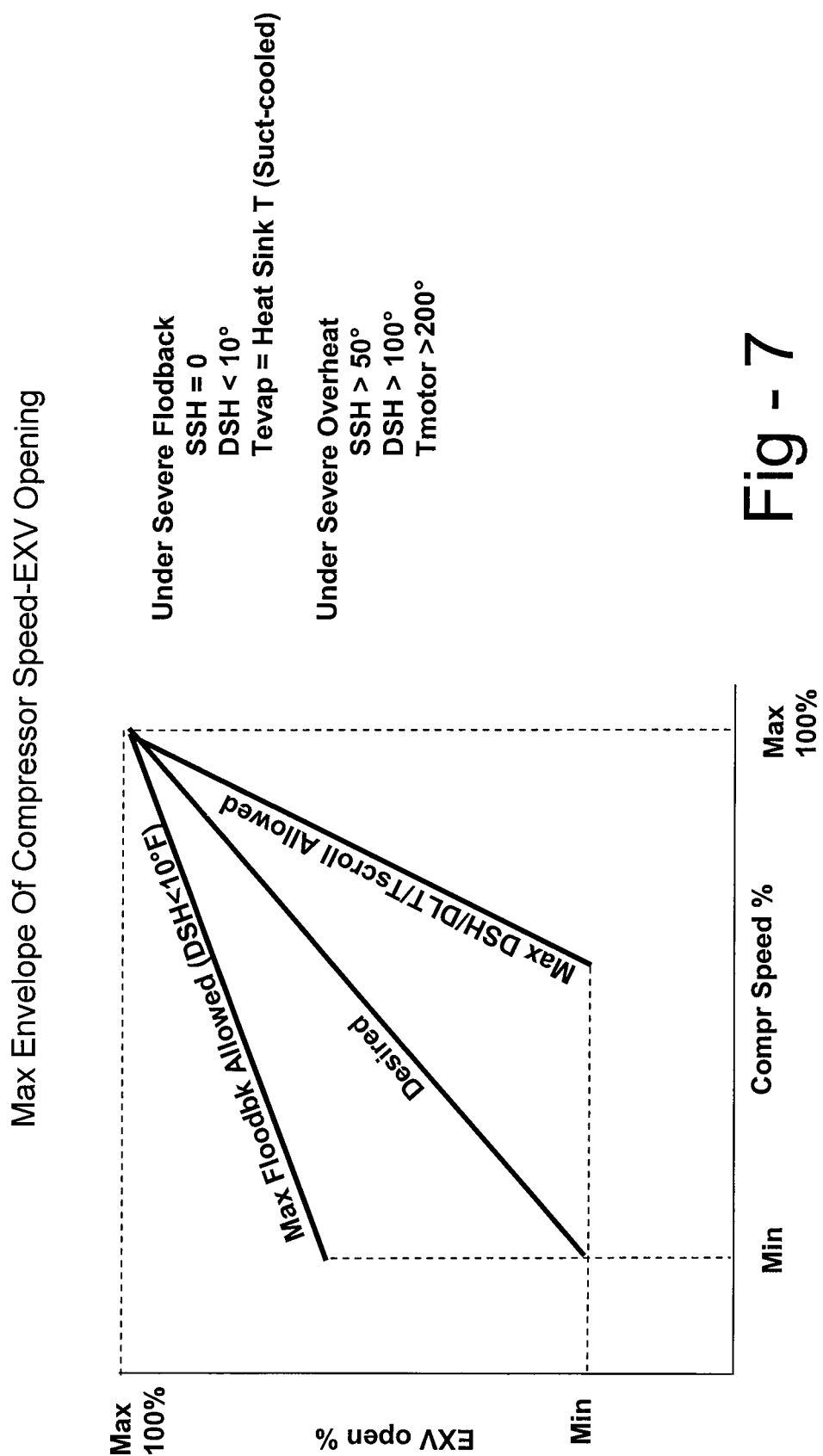
FIG. 7 is a graph showing an operating envelope of a compressor.

Control module 25 may monitor DSH and DLT to determine whether compressor 10 is operating within a predetermined operating envelope. As shown in FIG. 7, a compressor operating envelope may provide maximum flood back and maximum and/or minimum DSH/DLT limits. In addition, a maximum scroll temperature limit (Tscroll) may be provided, in the case of a scroll compressor. In addition, a maximum motor temperature (Tmotor) may be provided. As shown in FIG. 7, compressor speed and expansion valve 14 may be adjusted based on DSH and/or DLT to insure compressor operation within the compressor operating envelope. In this way, DSH and/or DLT may move back into an acceptable range as indicated by FIG. 7. Compressor speed adjustment may take priority over expansion valve adjustment. In some cases, such as a defrost state, it may be difficult for expansion valve 14 to respond quickly and compressor speed adjustment may be more appropriate.

In the event of a flood back condition, control module 25 may limit a compressor speed range. For example, when DSH is below thirty degrees Fahrenheit, compressor operation may be limited to the compressor's cooling capacity rating speed. For example, the cooling capacity rating speed may be 4500 RPM. When DSH is between thirty degrees Fahrenheit and sixty degrees Fahrenheit, compressor operating speed range may be expanded linearly to the full operating speed range. For example, compressor operating speed range may be between 1800 and 7000 RPM.

Figure 8:
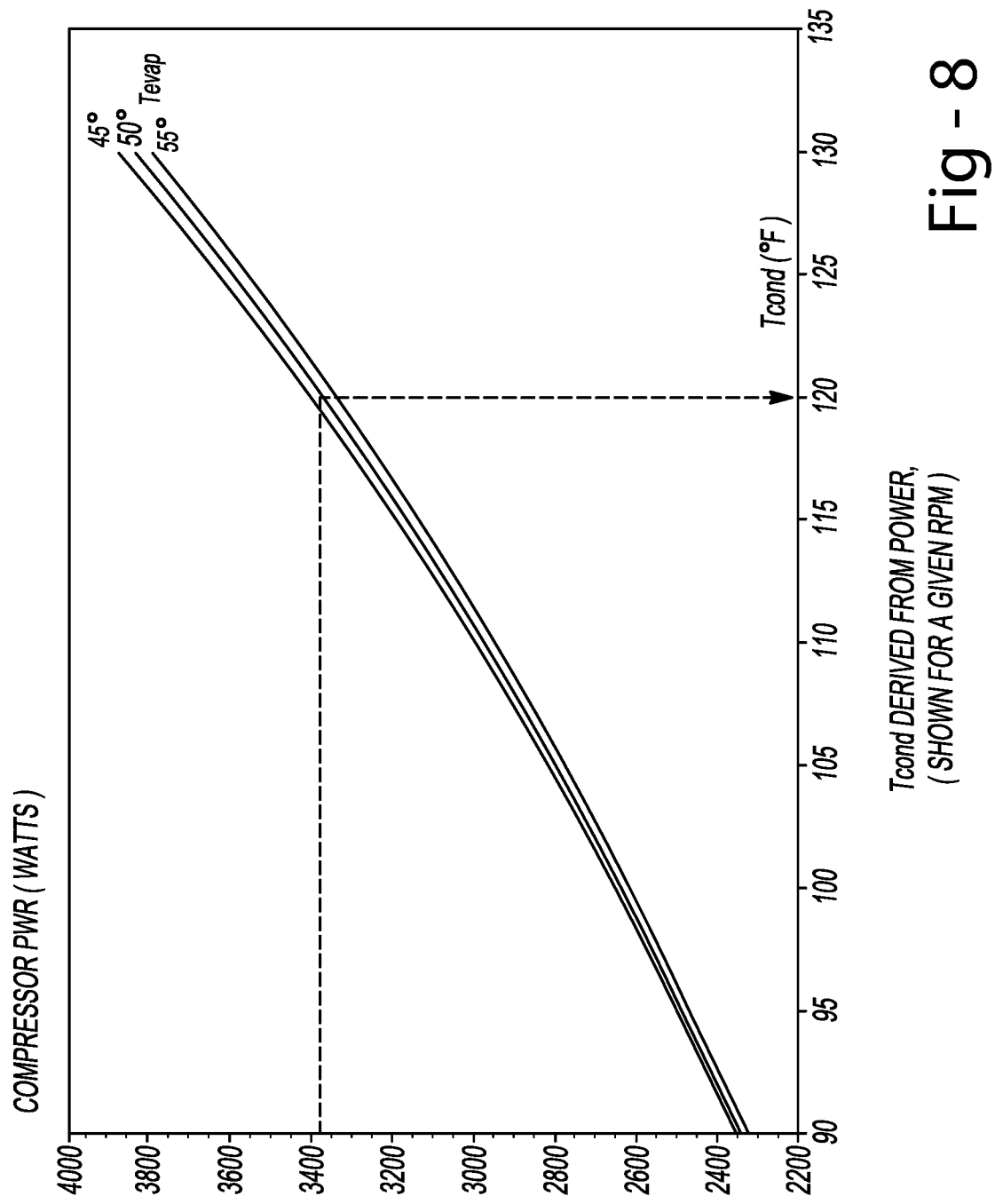
FIG. 8 is a graph showing condensing temperature correlated with evaporator temperature and compressor power for a given compressor speed.

The function correlating Tcond with compressor speed and power, may assume a predetermined or constant saturated Tevap. As shown in FIG. 8, the correlation between compressor power and Tcond may be insensitive to variations of Tevap.

For additional accuracy, Tevap may be derived as a function of Tcond and DLT, as described in commonly assigned U.S. application Ser. No. 11/059,646, U.S. Publication No. 2005/0235660. For variable speed compressors, the correlation may also reflect compressor speed. In this way, Tevap may be derived as a function of Tcond, DLT and compressor speed.

Figure 9:
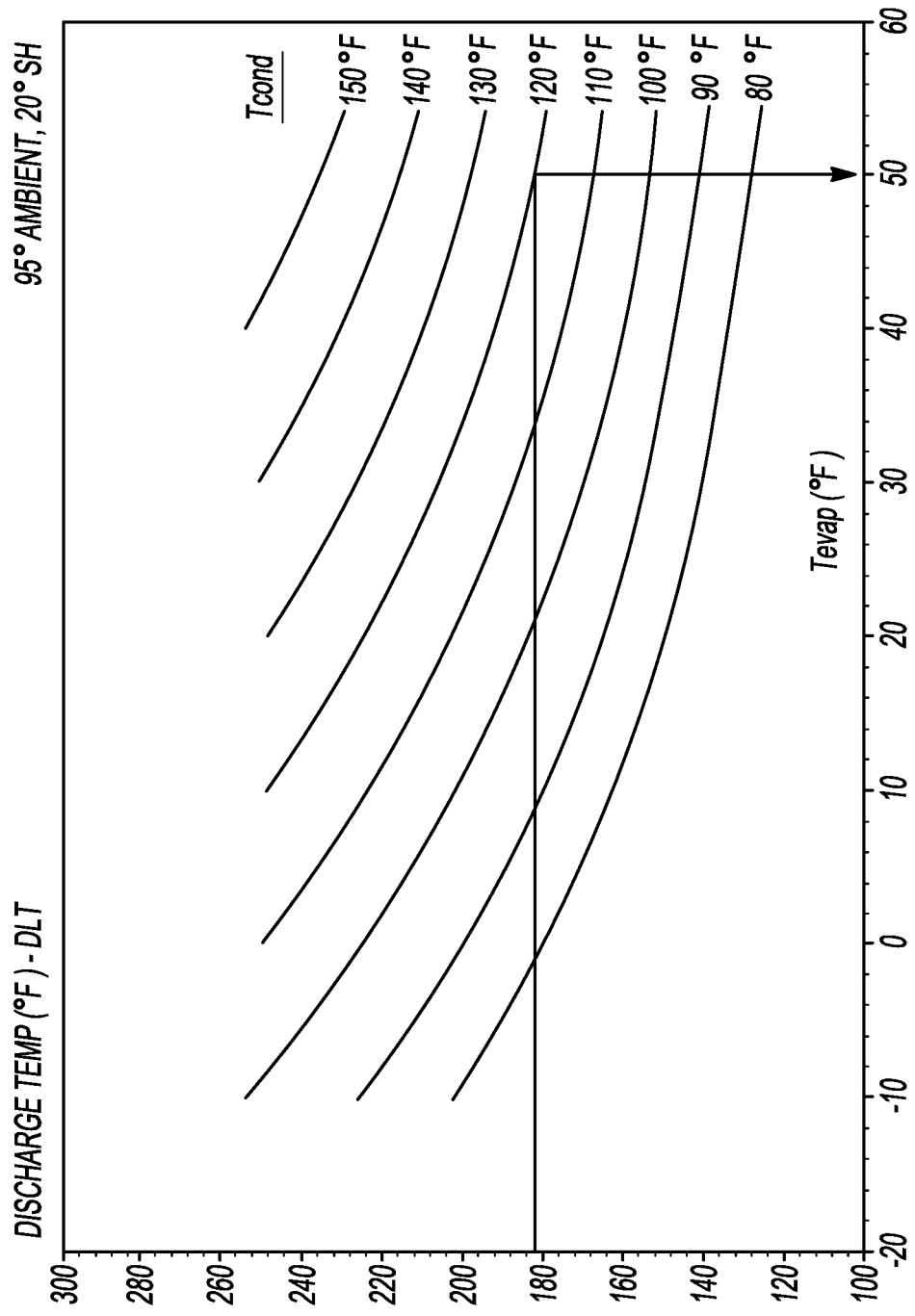
FIG. 9 is a graph showing discharge line temperature correlated with evaporator temperature and condenser temperature.

As shown in FIG. 9, Tevap is shown correlated with DLT, for various Tcond levels. For this reason, compressor map data for different speeds may be used.

Tcond and Tevap may be calculated based on a single derivation.

In addition, iterative calculations may be made based on the following equations:

$$T\text{cond} = f(\text{compressor power, compressor speed}, T\text{evap}) \quad \text{Equation 1:}$$

$$T\text{evap} = f(T\text{cond, DLT, compressor speed}) \quad \text{Equation 2:}$$

Multiple iterations of these equations may be performed to achieve convergence. For example, three iterations may provide optimal convergence. As discussed above, more or less iteration, or no iterations, may be used.

Tevap and Tcond may also be determined by using compressor map data, for different speeds, based on DLT and compressor power, based on the following equations:

$$T\text{evap} = f(\text{compressor power, compressor speed, DLT}) \quad \text{Equation 3:}$$

$$T\text{cond} = f(\text{compressor power, compressor speed, DLT}) \quad \text{Equation 4:}$$

Once Tevap and Tcond are known, additional compressor performance parameters may be derived. For example, compressor capacity and compressor efficiency may be derived based on additional compressor performance map data for a specific compressor model and capacity. Such additional compressor map data may be derived from test data. For example, compressor mass flow or capacity, may be derived according to the following equation:

$$T\text{evap} = f(\text{compressor speed}, T\text{cond, mass flow}) \quad \text{Equation 5:}$$

Mass flow may be derived according to the following equation:

$$\begin{aligned}\text{Mass Flow} = &\, m0 + m1\,T\text{evap} + m2\,^*T\text{cond} + m3\,^*\text{RPM} + \\ &\, m4\,^*T\text{evap}\,^*T\text{cond} + m5\,^*T\text{evap}\,^*\text{RPM} + \\ &\, m6\,^*T\text{cond}\,^*\text{RPM} + m7\,^*T\text{evap}^\wedge 2 + m8\,^*T\text{cond}^\wedge 2 + \\ &\, m9\,^*\text{RPM}^\wedge 2 + m10\,^*T\text{evap}\,^*T\text{cond}\,^*\text{RPM} + \\ &\, m11\,^*T\text{evap}^\wedge 2\,^*T\text{cond} + m12\,^*T\text{evap}^\wedge 2\,^*\text{RPM} + \\ &\, m13\,^*T\text{evap}^\wedge 3 + m14\,^*T\text{evap}\,^*T\text{cond}^\wedge 2 + \\ &\, m15\,^*T\text{cond}^\wedge 2\,^*\text{RPM} + m16\,^*T\text{cond}^\wedge 3 + \\ &\, m17\,^*T\text{evap}\,^*\text{RPM}^\wedge 2 + m18\,^*T\text{cond}\,^*\text{RPM}^\wedge 2 + \\ &\, m19\,^*\text{RPM}^\wedge 3 \quad \text{Equation 6:}\end{aligned}$$

where m0-m19 are compressor model and size specific, as published by compressor manufacturers.

Compressor map data may be stored within a computer readable medium within control module 25 or accessible to control module 25.

Figure 10:
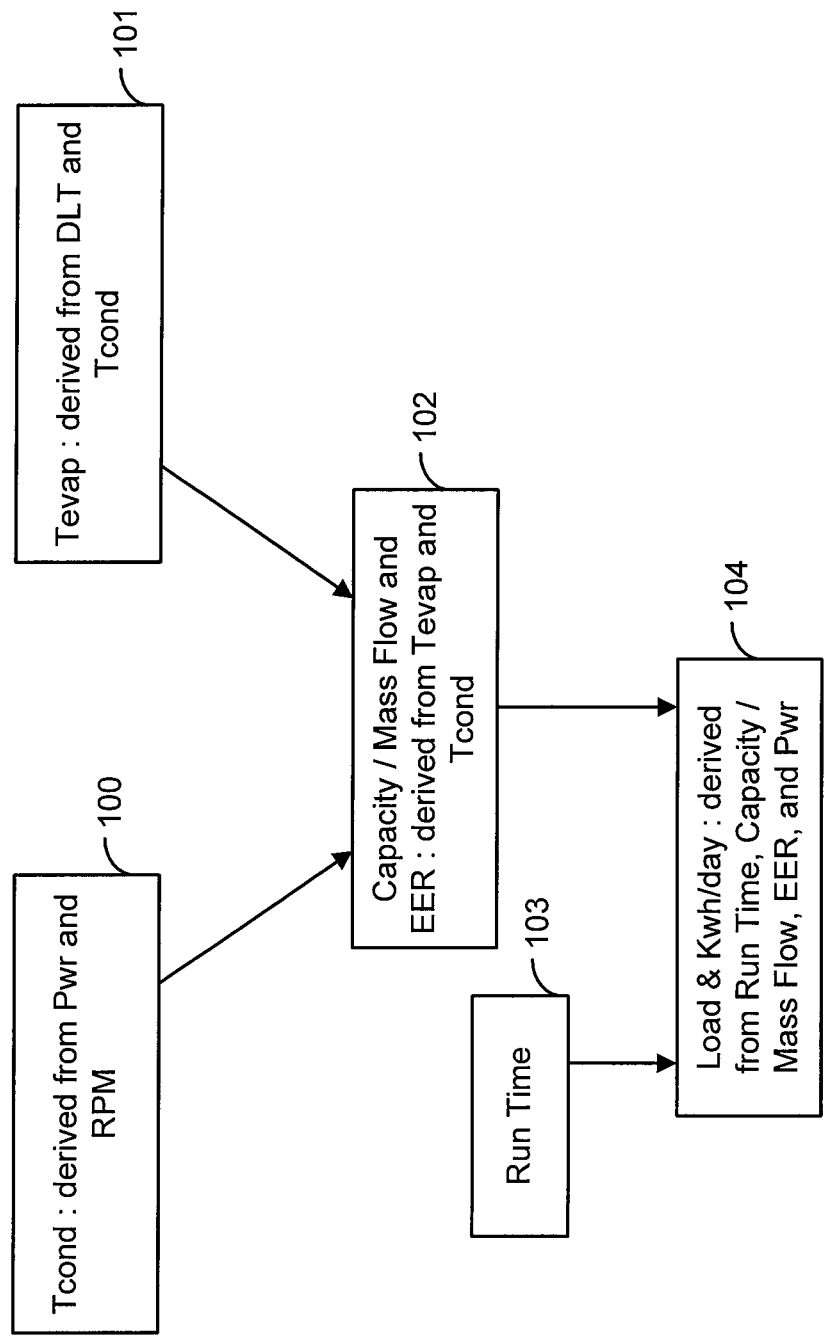
FIG. 10 is a flow chart showing derived data for a refrigeration system.

As shown in FIG. 10, a flow chart for derived parameters is shown. In step 100, Tcond may be derived from compressor power and compressor speed. In step 101, Tevap may be derived from DLT and Tcond. In step 102, capacity/mass flow and a compressor energy efficiency ratio may be derived from Tevap and Tcond. In addition, by monitoring run time in step 103, additional parameters may be derived. Specifically, in step 104, load and Kwh/Day may be derived from run time, capacity/mass flow, EER, and compressor power.

By monitoring the above operating parameters, control module 25 may insure that compressor 10 is operating within acceptable operating envelope limits that are preset by a particular compressor designer or manufacturer and may detect and predict certain undesirable operating conditions, such as compressor floodback and overheat conditions. Further, control module 25 may derive other useful data related to compressor efficiency, power consumption, etc.

Where compressor 10 is driven by a suction cooled inverter drive 22, Tevap may be alternatively calculated. Because Tevap may be calculated from mass flow, Tcond, and compressor speed as discussed above, control module 25 may derive mass flow from a difference in temperature between suction gas entering cold plate 15 (Ts) and a temperature of a heat sink (Ti) located on or near inverter drive 22. Control module 25 may calculate delta T according to the following equation:

$$\text{delta } T = Ts - Ti \quad \text{Equation 7:}$$

Figure 11:
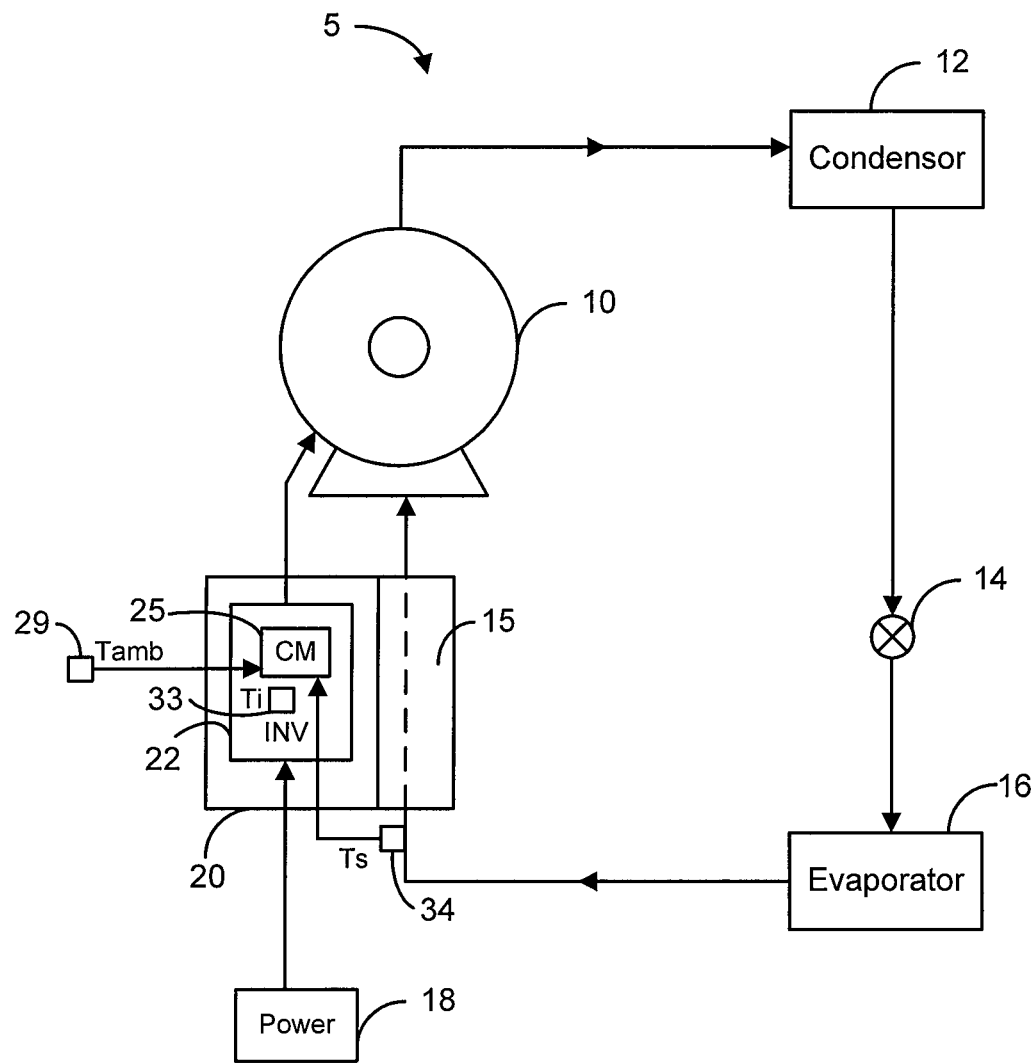
FIG. 11 is a schematic of a refrigeration system.

Ts and Ti may be measured by two temperature sensors 33 and 34 shown in FIG. 11. Temperature sensor 33 measures the temperature of the heat sink (Ti) and may be incorporated as part of inverter drive 22. Alternatively, temperature sensor 33 may measure a temperature of suction gas exiting cold plate 15 and may be located on or near the piping between cold plate 15 and compressor 10. Temperature sensor 34 measures the temperature of suction gas entering cold plate 15.

Figure 12:
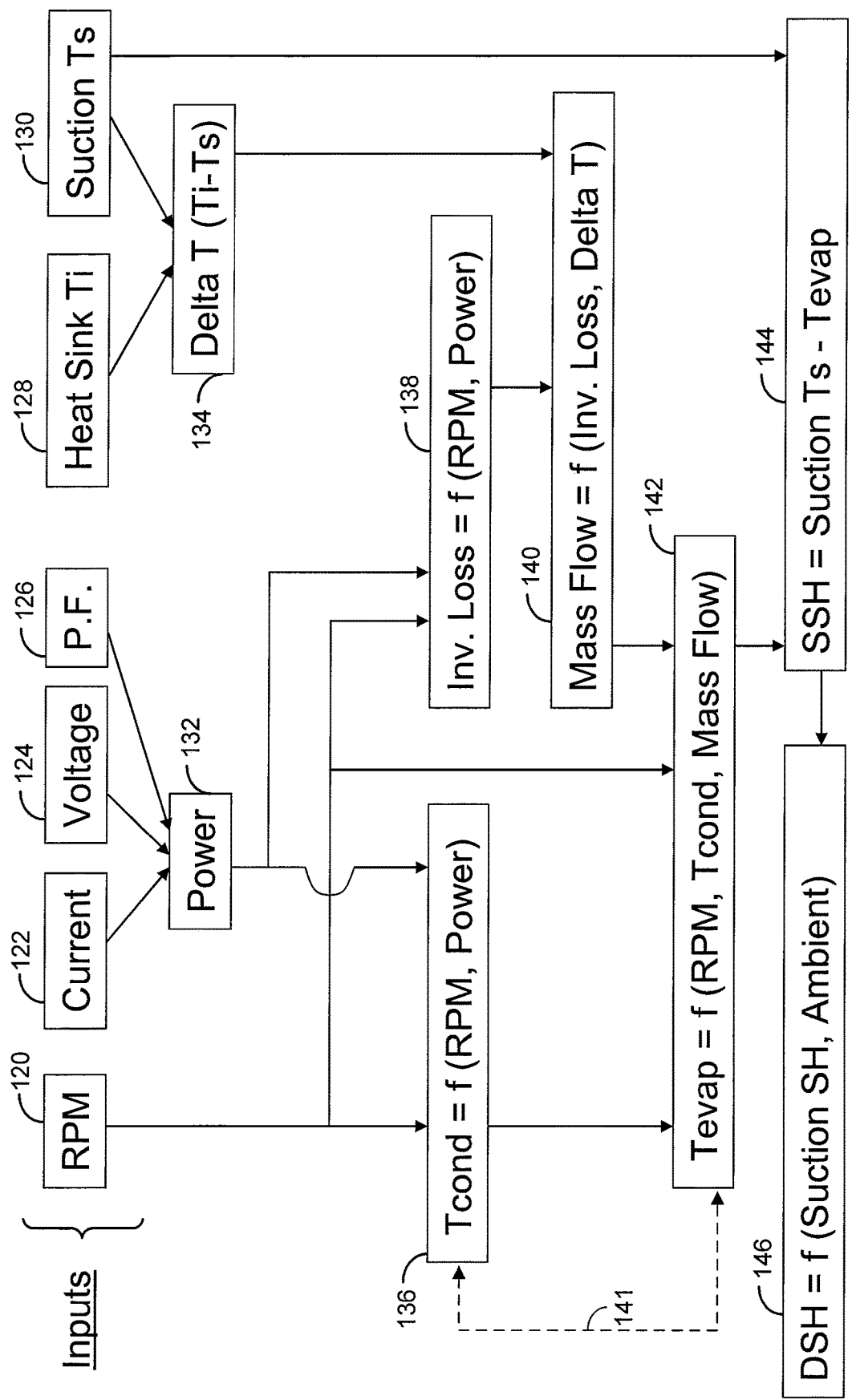
FIG. 12 is a flow chart showing derived data for a refrigeration system.
Figure 13:
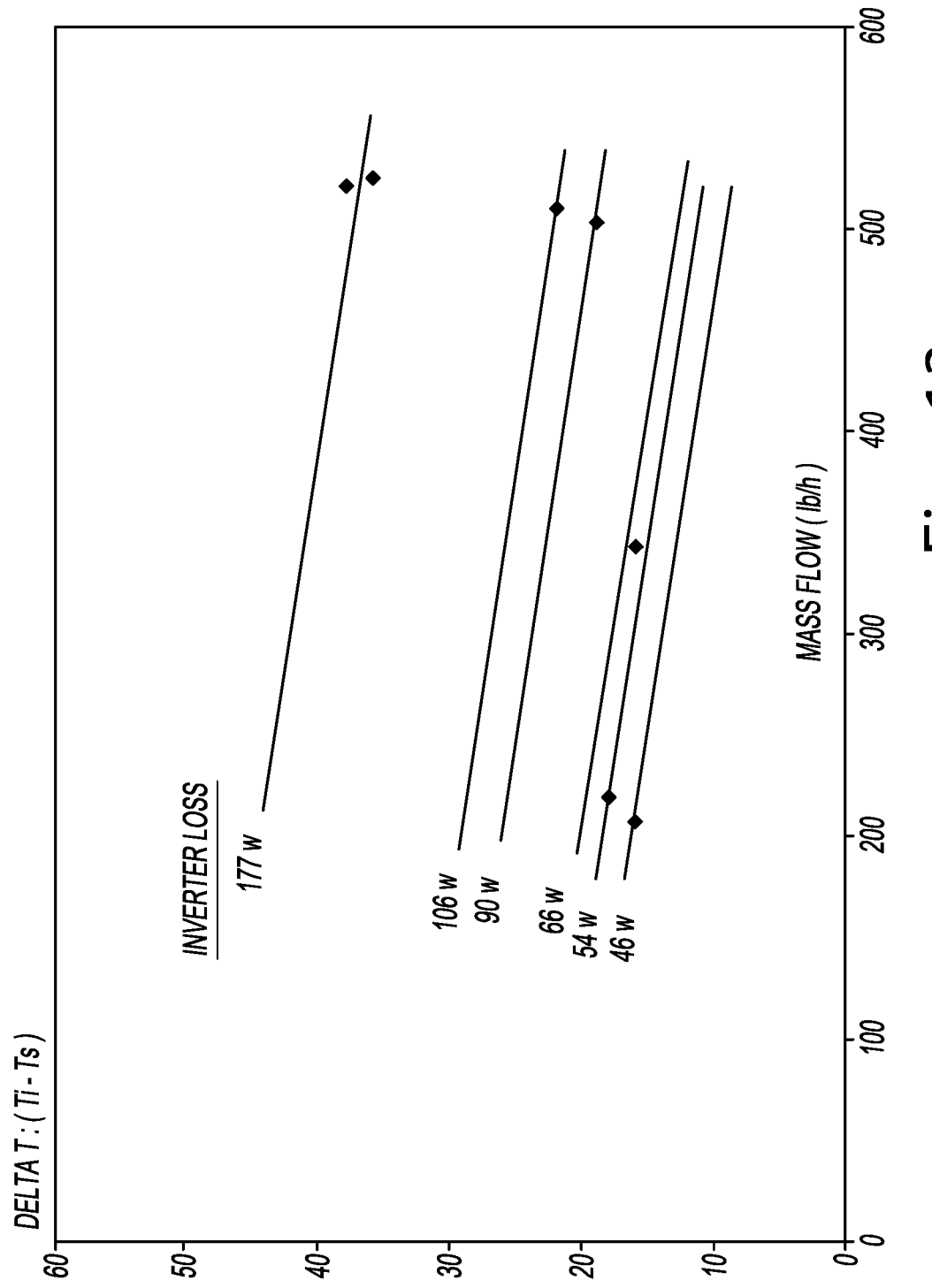
FIG. 13 is a graph showing mass flow correlated with inverter drive heat loss.

Control module 25 may determine mass flow based on delta T and by determining the applied heat of inverter drive 22. As shown in FIG. 12, mass flow may be derived based on lost heat of inverter drive 22 and delta T. As shown in FIG. 13, the relationship between mass flow, delta T and applied inverter heat may be mapped based on test data.

Figure 14:
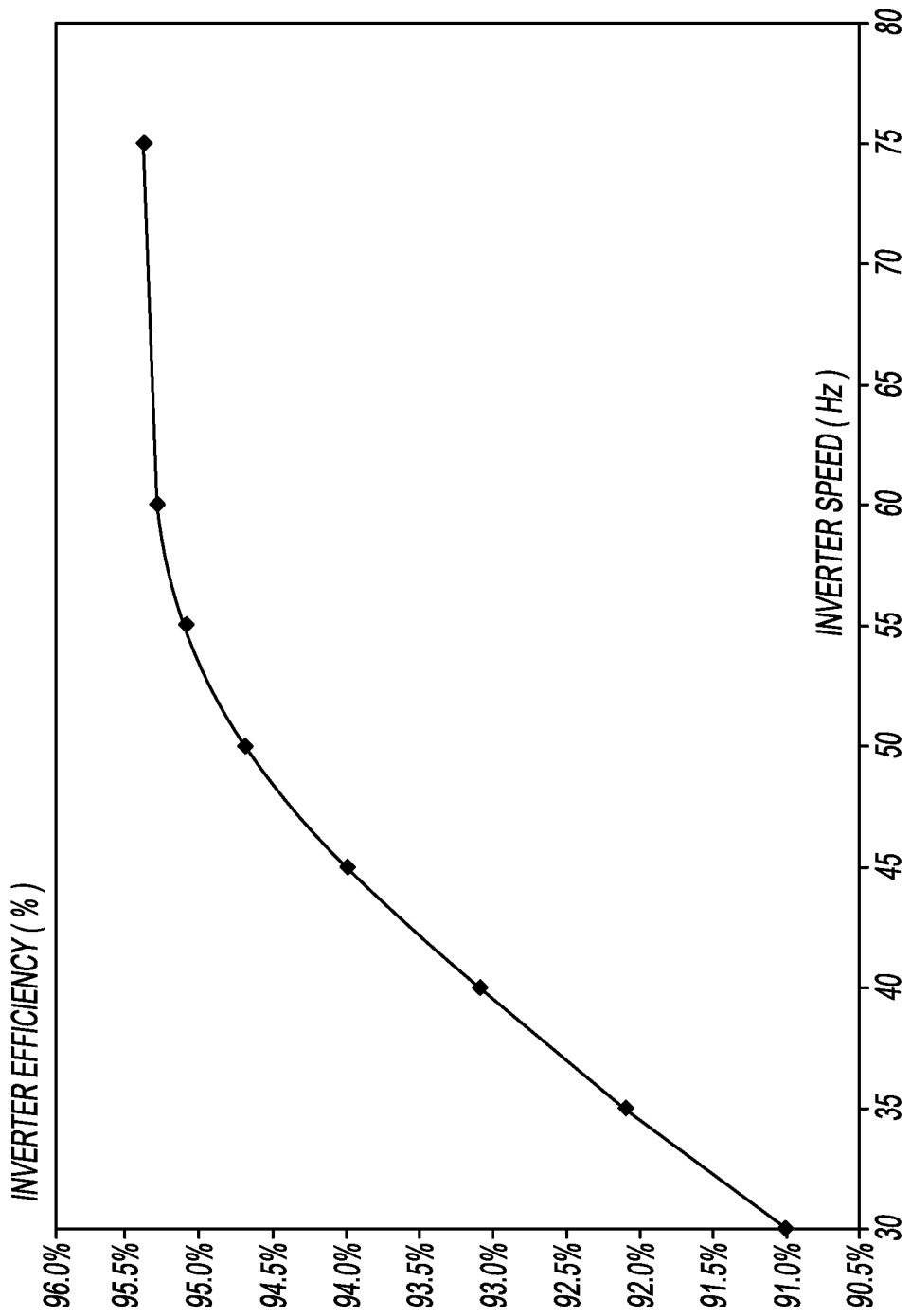
FIG. 14 is a graph showing inverter speed correlated with inverter efficiency.

Inverter heat may be derived based on inverter speed (i.e., compressor speed) and inverter efficiency as shown in FIG. 14.

With reference again to FIG. 12, inputs include compressor speed (RPM) 120, compressor current 122, compressor voltage 124, compressor power factor 126, Ti 128 and Ts 130. From compressor current 122, compressor voltage 124, and power factor 126, compressor power 132 is derived. From temperatures Ti 128 and Ts 130, delta T 134 is derived. From RPM 120 and power, Tcond 136 is derived. Also from RPM 120 and power 132, inverter heat loss 138 is derived. From inverter heat loss, and delta T 134, mass flow 140 is derived. From RPM 120, Tcond 136, and mass flow 140, Tevap 142 is derived. From Tevap 142 and Ts 130, SSH 144 is derived. From SSH 144 and ambient temperature as sensed by ambient temperature sensor 29, DSH 146 is derived. Once DSH 146 is derived, all of the benefits of the algorithms described above may be gained, including protection of compressor 10 from flood back and overheat conditions.

As shown by dotted line 141, Tcond and Tevap may be iteratively calculated to more accurately derive Tcond and Tevap. For example, optimal convergence may be achieved with three iterations. More or less iterations may also be used.

Figure 15:
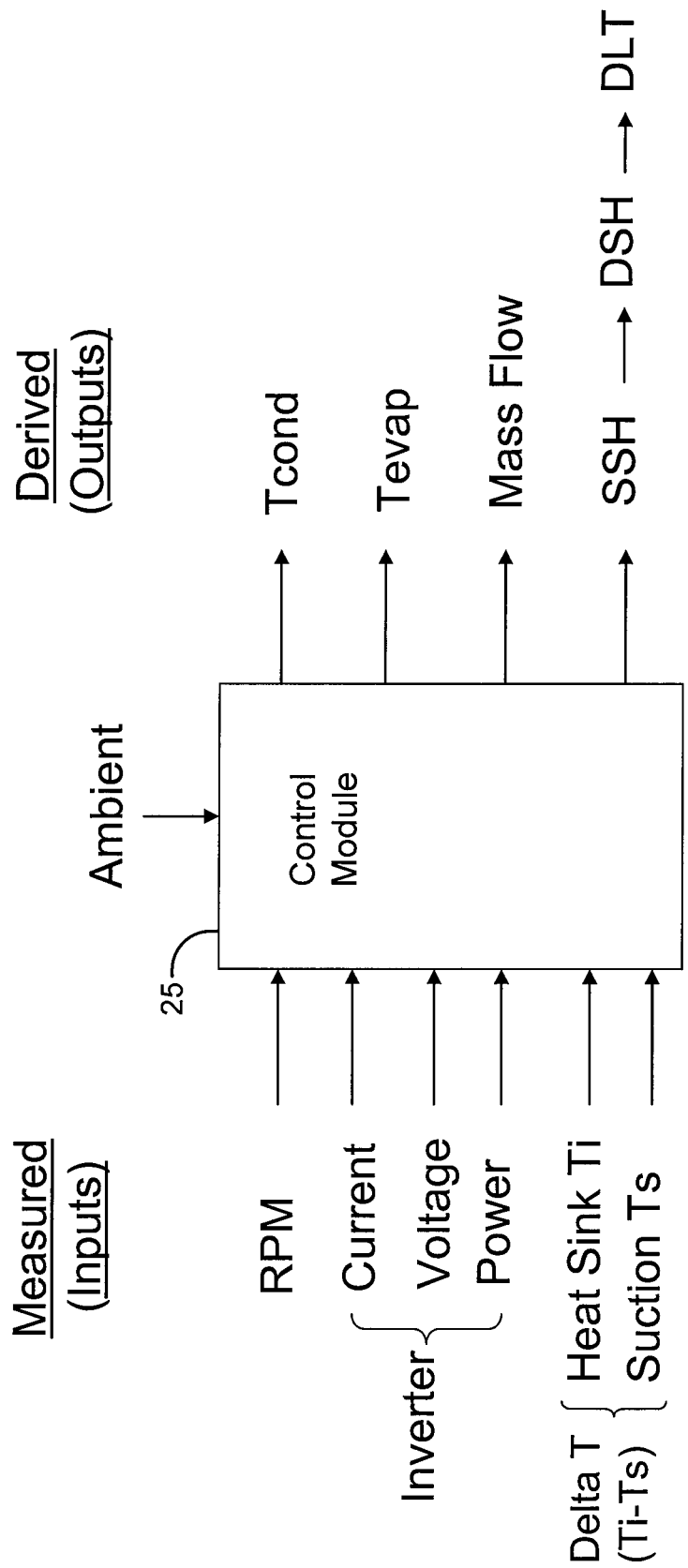
FIG. 15 is a graph showing a control module with measured inputs and derived outputs.

As shown in FIG. 15, control module 25 takes as measured inputs compressor speed RPM, inverter drive current, voltage, and power, and heat sink temperatures Ti and Ts. Control module also takes as input ambient temperature as indicated by ambient temperature sensor 29. As discussed above, control module 25 derives from these measured inputs the outputs of Tcond, Tevap, mass flow, SSH, DSH, and DLT.

Figure 16:
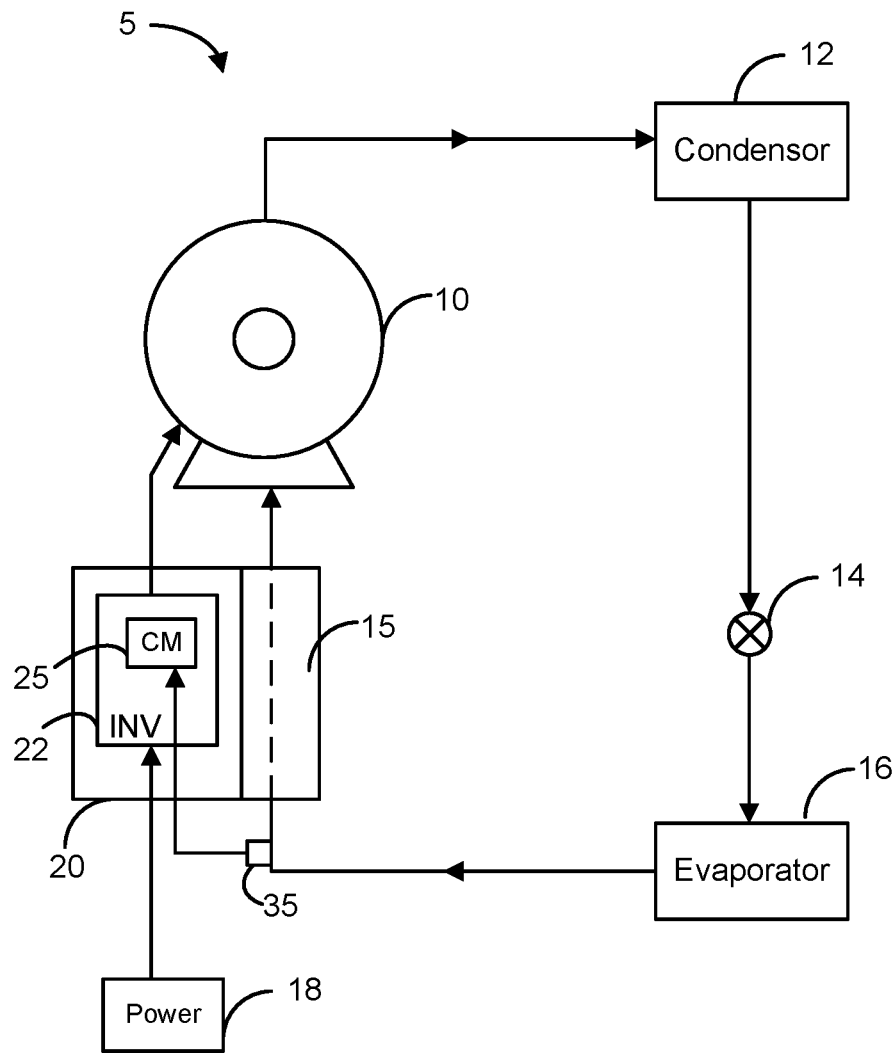
FIG. 16 is a schematic of a refrigeration system.
Figure 17:
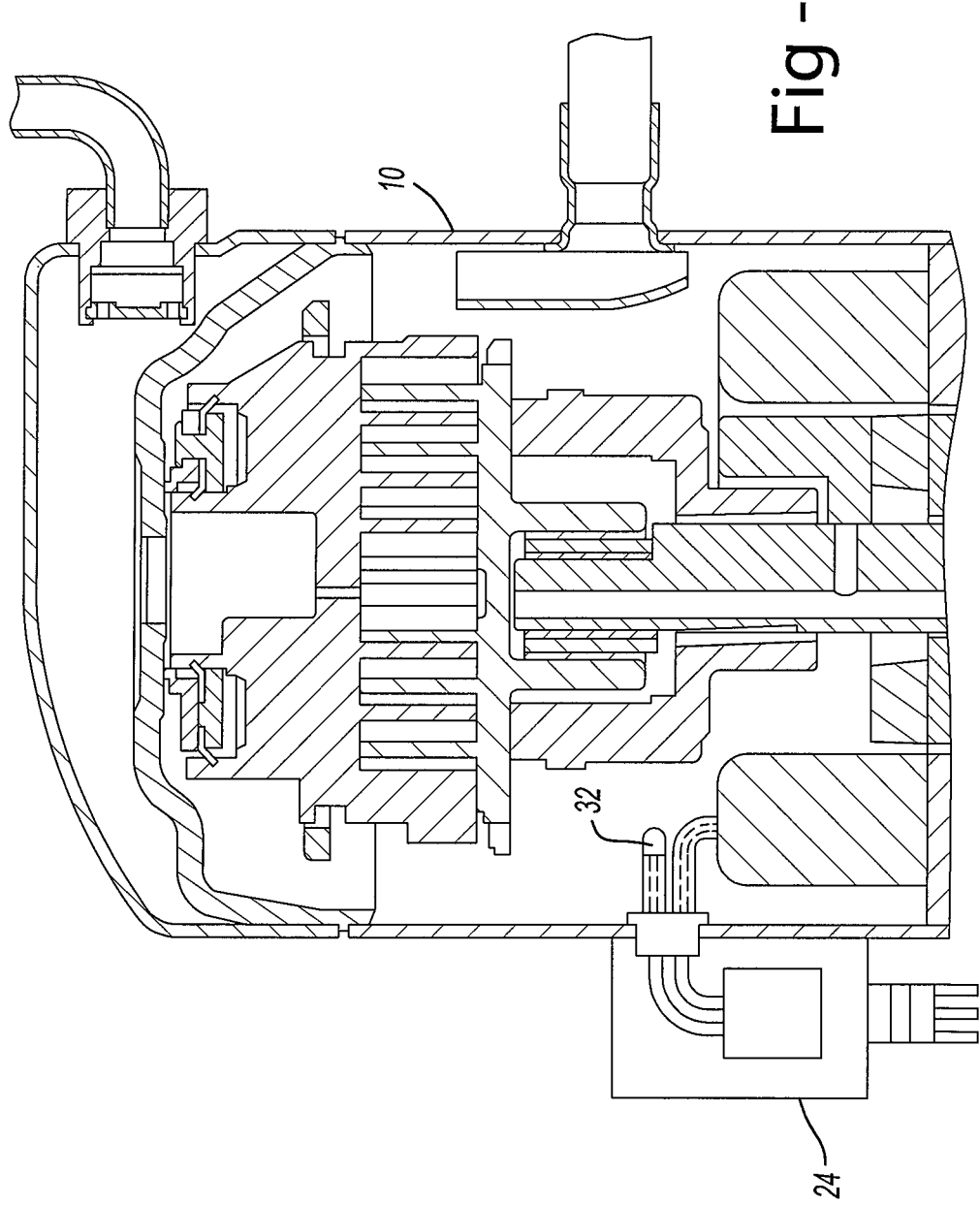
FIG. 17 is a cross-section view of a compressor.

As shown in FIG. 16, control module 25 may monitor SLT with SLT sensor 35, which may include a combination pressure and temperature sensor may be used. In such case, Tevap may be measured based on the suction pressure as measured by the pressure portion of the combination sensor. Further, SSH may be calculated based on SLT, as measured by the temperature portion of the combination sensor, and Tevap. SLT sensor 34, 35 may be located at an inlet to compressor 10 and may sense a temperature or pressure of refrigerant entering compressor 10 subsequent to inverter 22, enclosure 20, or cold plate 15. Alternatively SLT sensor may be located at an inlet to enclosure 20, inverter 22, or cold plate 15 and may sense a temperature or pressure of refrigerant entering the enclosure 20, inverter 22, or cold plate 15.

In addition, similar to the calculation of DSH based on DLT described above, control module 25 may also calculate SSH. For example, compressor power, compressor speed, and compressor map data may be used to derive Tcond and Tevap may be derived from Tcond. Once Tevap is derived, SSH may be derived from SLT and Tevap and used as described above for monitoring various compressor operating parameters and protecting against flood back and overheat conditions.

What is claimed is:

1. A method comprising:
   receiving, with a controller, compressor power data;
   determining, with the controller, a saturated condenser temperature of a condenser connected to a compressor based on the compressor power data;
   receiving, with the controller, a discharge line temperature signal that corresponds to a discharge line temperature of refrigerant leaving the compressor;
   calculating, with the controller, a discharge superheat temperature based on the saturated condenser temperature and the discharge line temperature;
   monitoring, with the controller, a flood back condition of the compressor by comparing the discharge superheat temperature with a predetermined threshold; and
   increasing a speed of the compressor, with the controller, when the discharge superheat temperature is less than or equal to the predetermined threshold.

2. The method of claim 1 wherein the predetermined threshold is thirty degrees Fahrenheit.

3. The method of claim 1 wherein the controller increases the speed of the compressor when the discharge superheat temperature is less than or equal to the predetermined threshold.

4. The method of claim 1 further comprising decreasing, with the controller, an opening of an expansion valve associated with the compressor when the discharge superheat temperature is less than or equal to the predetermined threshold.

5. The method of claim 1 further comprising monitoring, with the controller, a sudden flood back condition by determining whether the discharge superheat temperature decreases by a predetermined amount within a predetermined time period.

6. The method of claim 1 further comprising receiving, with the controller, a discharge pressure signal corresponding to a discharge pressure of refrigerant leaving the compressor and determining the saturated condenser temperature based on the discharge pressure.

7. The method of claim 1 further comprising determining, with the controller, the saturated condenser temperature as a function of the compressor power data and the speed of the compressor.

8. The method of claim 1 further comprising receiving, with the controller, compressor power data, determining a saturated evaporator temperature of an evaporator connected to the compressor and the condenser as a function of the saturated condenser temperature, the discharge line temperature, and the speed of the compressor, and determining the saturated condenser temperature as a function of the compressor power data, the speed of the compressor, and the saturated evaporator temperature.

9. The method of claim 8 further comprising performing, with the controller, multiple iterations of determining the saturated condenser temperature and the saturated evaporator temperature to achieve convergence.

10. The method of claim 1 further comprising receiving, with the controller, compressor power data and determining the saturated condenser temperature as a function of the compressor power data, the speed of the compressor, and the discharge line temperature.

* * * * *